United States Patent
Wheatley et al.

(10) Patent No.: US 6,967,778 B1
(45) Date of Patent: Nov. 22, 2005

(54) OPTICAL FILM WITH SHARPENED BANDEDGE

(75) Inventors: John A. Wheatley, Lake Elmo, MN (US); Michael F. Weber, Shoreview, MN (US); Andrew J. Ouderkirk, Woodbury, MN (US)

(73) Assignee: 3M Innovative Properties Co., St. Paul, MN (US)

( * ) Notice: Subject to any disclaimer, the term of this patent is extended or adjusted under 35 U.S.C. 154(b) by 783 days.

(21) Appl. No.: 09/634,319

(22) Filed: Aug. 9, 2000

Related U.S. Application Data

(63) Continuation of application No. 09/006,085, filed on Jan. 13, 1998.

(51) Int. Cl.$^7$ .............................................. G02B 1/10
(52) U.S. Cl. .................................... 359/580; 359/587
(58) Field of Search ................................ 359/584, 580, 359/586, 588, 589, 590

(56) References Cited

U.S. PATENT DOCUMENTS

| | | | | |
|---|---|---|---|---|
| 3,124,639 A | 3/1964 | Kahn | ............................ | 88/65 |
| 3,610,729 A | 10/1971 | Rogers | ........................ | 350/157 |
| 3,711,176 A | 1/1973 | Alfrey, Jr. et al. | ............... | 350/1 |
| 3,860,036 A | 1/1975 | Newman, Jr. | ................ | 138/45 |
| 4,446,305 A | 5/1984 | Rogers et al. | ............... | 528/348 |
| 4,520,189 A | 5/1985 | Rogers et al. | ............... | 528/331 |
| 4,521,588 A | 6/1985 | Rogers et al. | ............... | 528/363 |
| 4,525,413 A | 6/1985 | Rogers et al. | ............... | 428/212 |
| 4,720,426 A | 1/1988 | Englert et al. | .............. | 428/344 |
| 4,747,666 A | 5/1988 | Ishida | ........................ | 350/164 |
| 5,103,337 A | 4/1992 | Schrenk et al. | ............ | 359/359 |
| 5,179,468 A | 1/1993 | Gasloli | ........................ | 359/359 |
| 5,188,760 A | 2/1993 | Hikmet et al. | ......... | 252/299.01 |
| 5,211,878 A | 5/1993 | Reiffenrath et al. | .... | 252/299.63 |
| 5,235,443 A | 8/1993 | Barnik et al. | .................. | 359/37 |
| 5,269,995 A | 12/1993 | Ramanathan et al. | ........ | 264/171 |
| 5,294,657 A | 3/1994 | Melendy et al. | ............. | 524/270 |
| 5,316,703 A | 5/1994 | Schrenk | ....................... | 264/1.3 |
| 5,319,478 A | 6/1994 | Fijnfschilling et al. | ........ | 359/53 |
| 5,360,659 A | 11/1994 | Arends et al. | ............... | 428/216 |
| 5,389,324 A * | 2/1995 | Lewis et al. | ........... | 264/173.12 |
| 5,448,404 A | 9/1995 | Schrenk et al. | .............. | 359/584 |

(Continued)

FOREIGN PATENT DOCUMENTS

| | | | | |
|---|---|---|---|---|
| WO | WO 93/16878 | 9/1993 | ............ | B32B/27/30 |
| WO | WO 94/10589 | 5/1994 | ............ | G02B/1/10 |
| WO | WO 95/27919 | 4/1995 | ............ | G02B/27/28 |
| WO | WO 95/17303 | 6/1995 | ............ | B32B/7/02 |
| WO | WO 95/17691 | 6/1995 | ............ | G02B/5/30 |
| WO | WO 95/17692 | 6/1995 | ............ | G02B/5/30 |
| WO | WO 95/17699 | 6/1995 | ............ | G02F/1/335 |
| WO | WO 96/19347 | 6/1996 | ............ | B32B/7/02 |
| WO | WO 97/01440 | 1/1997 | ............ | B32B/27/36 |
| WO | WO 97/01774 | 1/1997 | ............ | G02B/1/10 |
| WO | WO 97/32226 | 9/1997 | ............ | G02B/5/30 |

OTHER PUBLICATIONS

Merck Japan Limited, Transmax, Reflective polarizer product brochure (Jan. 1998).
Schrenk et al., Nanolayer polymeric optical films, Tappi Journal, pp. 169–174, Jun., 1992.

*Primary Examiner*—Audrey Chang
(74) *Attorney, Agent, or Firm*—Robert J. Pechman

(57) ABSTRACT

The present invention provides reflective films and other optical bodies which exhibit sharp bandedges on one or both sides of the main reflection bands. The optical bodies comprise multilayer stacks $M_1$ and $M_2$, each having first order reflections in a desired part of the spectrum and comprising optical repeating units $R_1$ and $R_2$, respectively. At least one of the optical repeating units $R_1$ and $R_2$ varies monotonically in optical thickness along the thickness of the associated multilayer stack.

6 Claims, 12 Drawing Sheets

U.S. PATENT DOCUMENTS

| | | |
|---|---|---|
| 5,486,935 A | 1/1996 | Kalmanash .................. 359/37 |
| 5,486,949 A | 1/1996 | Schrenk et al. ............. 359/498 |
| 5,612,820 A | 3/1997 | Schrenk et al. ............. 359/498 |
| 5,629,055 A | 5/1997 | Revol et al. .................... 428/1 |
| 5,686,979 A | 11/1997 | Weber et al. ................ 349/96 |
| 5,699,188 A | 12/1997 | Gilbert et al. .............. 359/584 |
| 5,721,603 A | 2/1998 | De Vaan et al. ............ 349/194 |
| 5,744,534 A | 4/1998 | Ishiharada et al. .......... 524/442 |
| 5,751,388 A | 5/1998 | Larson ........................ 349/96 |
| 5,767,935 A | 6/1998 | Ueda et al. ................. 349/112 |
| 5,770,306 A | 6/1998 | Suzuki et al. ............... 428/328 |
| 5,783,120 A | 7/1998 | Ouderkirk et al. .......... 264/134 |
| 5,793,456 A | 8/1998 | Broer et al. .................. 349/98 |
| 5,808,794 A | 9/1998 | Weber et al. ............... 359/487 |
| 5,825,542 A | 10/1998 | Cobb, Jr. et al. ........... 359/487 |
| 5,825,543 A | 10/1998 | Ouderkirk et al. .......... 359/494 |

\* cited by examiner

US 6,967,778 B1

OPTICAL FILM WITH SHARPENED BANDEDGE

This is a continuation of application Ser. No. 09/006,085 filed Jan. 13, 1998.

FIELD OF THE INVENTION

The present invention relates generally to multilayer optical bodies, and in particular to multilayer films exhibiting a sharpened reflective bandedge.

BACKGROUND OF THE INVENTION

The use of multilayer reflective films comprising alternating layers of two or more polymers to reflect light is known and is described, for example, in U.S. Pat. No. 3,711,176 (Alfrey, Jr. et al.), U.S. Pat. No. 5,103,337 (Schrenk et al.), WO 96/19347, and WO 95/17303. The reflection and transmission spectra of a particular multilayer film depends primarily on the optical thickness of the individual layers, which is defined as the product of the actual thickness of a layer times its refractive index. Accordingly, films can be designed to reflect infrared, visible or ultraviolet wavelengths $\lambda_M$ of light by choice of the appropriate optical thickness of the layers in accordance with the following formula:

$$\lambda_M = (2/M)^* D_r \qquad \text{(Formula I)}$$

wherein M is an integer representing the particular order of the reflected light and $D_r$ is the optical thickness of an optical repeating unit (also called a multilayer stack) comprising two or more polymeric layers. Accordingly, $D_r$ is the sum of the optical thicknesses of the individual polymer layers that make up the optical repeating unit. $D_r$ is always one half lambda in thickness, where lambda is the wavelength of the first order reflection peak. By varying the optical thickness of an optical repeating unit along the thickness of the multilayer film, a multilayer film can be designed that reflects light over a broad band of wavelengths. This band is commonly referred to as the reflection band or stop band.

It is desirable for a reflection band to have a sharp spectral edge at the long wavelength (red) and/or short wavelength (blue) side. However, the reflective films known to the art that contain an optical repeating unit of varying optical thickness typically have moderately sloped bandedges which cause reflections outside of the desired wavelengths of interest. For example, if a reflective film is designed to reflect infrared light while being transparent over the visible spectrum, a sloped edge on the blue side of the reflection band may encroach into the visible region of the spectrum, thereby resulting in unwanted coloring of the infrared reflective film body. Such coloring can be avoided by designing the infrared film such that the infrared reflection band is moved further into the infrared region, but this results in substantial transmission of infrared light near the visible region of the spectrum.

In other situations, it may be desirable to design a reflective film or other optical body that reflects light over a selected range in the visible region of the spectrum, e.g., a reflective film that reflects only green light. In such a case, it may be desirable to have sharp edges at both the red and blue sides of the reflection band.

Many prior art reflective films comprising multilayer stacks also show a number of small reflection peaks near the reflection band. This so-called "ringing" also may introduce unwanted reflections. It has been suggested in the art that, for multilayer films that consist of an optical repeating unit of constant optical thickness, such ringing might be suppressed by adding a number of optical repeating units having an optical thickness of half that of the other optical repeating units responsible for the reflection band. However, while this approach may eliminate ringing, it does not improve bandedge sharpness and, in fact, may worsen it. Furthermore, this approach requires the presence of strippable skins on multilayer extruded films, since it permits only thin layers of specific optical thickness on the surface.

There is thus a need in the art for a reflective film, and a method of making the same, that exhibits a sharp bandedge on one or both sides of the main reflection band, and that avoids the presence of ringing and other undesirable reflections. These and other needs are met by the present invention, as hereinafter described.

SUMMARY OF THE INVENTION

The present invention provides reflective films and other optical bodies which exhibit sharp bandedges on one or both sides of the main reflection bands. The optical bodies of the present invention comprise multilayer stacks $M_1$ and $M_2$, each having first order reflections in a desired part of the spectrum and comprising optical repeating units $R_1$ and $R_2$, respectively. The optical repeating units $R_1$ and $R_2$ each comprise at least a first polymeric layer and a second polymeric layer, said first and second polymeric layers having associated with them an index of refraction $n_1$ and $n_2$, respectively, the difference between $n_1$ and $n_2$ being at least 0.05. The optical repeating unit $R_1$ varies substantially monotonically in optical thickness along the thickness of said multilayer stack $M_1$, and the optical repeating unit $R_2$ is of substantially constant optical thickness along the thickness of the multilayer stack $M_2$. The optical thickness of optical repeating unit $R_1$ is either less than or equal to the minimum optical thickness of optical repeating unit $R_1$ along the thickness of multilayer stack $M_1$, or else the optical thickness of optical repeating unit $R_2$ is equal to or greater than the maximum optical thickness of optical repeating unit $R_1$ along the thickness of multilayer stack $M_1$, or said optical repeating unit R2 varies substantially monotonically in optical thickness along the thickness of said multilayer stack $M_2$ opposite to said substantially monotonic optical thickness variation of optical repeating unit $R_1$ and the minimum optical thickness of optical repeating unit $R_2$ along the thickness of multilayer stack $M_2$ is substantially equal to the minimum optical thickness of optical repeating unit $R_1$ along the thickness of multilayer stack $M_1$ or the maximum optical thickness of optical repeating unit $R_2$ along the thickness of multilayer stack $M_2$ is substantially equal to the maximum optical thickness of optical repeating unit $R_1$ along the thickness of multilayer stack $M_1$.

BRIEF DESCRIPTION OF THE DRAWINGS

This patent application file contains at least one drawing executed in color copies of this patent or patent application with color drawing (s) will be provided by the office upon request and payment of the necessary fee.

The present invention is described in detail by reference to the following drawings, without, however, the intention to limit the invention thereto:

FIG. 11b is the calculated spectrum for the gradient of FIG. 11a;

FIG. 12b is the calculated spectrum for the gradient of FIG. 12a;

FIG. 13b is the calculated spectrum for the gradient of FIG. 13a.

DETAILED DESCRIPTION OF THE INVENTION

Figure 1A:
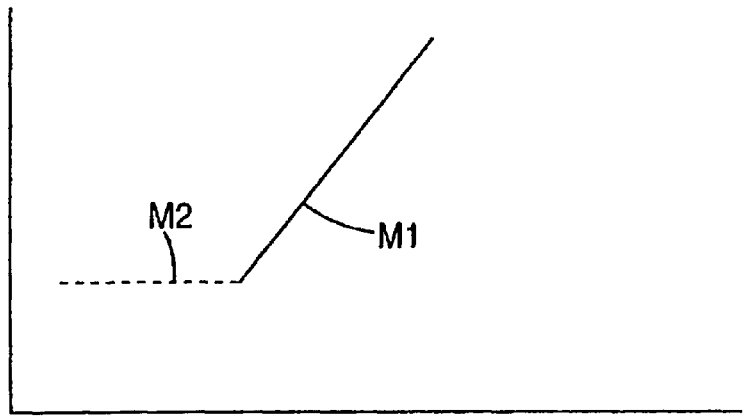
FIGS. 1*a* to 1*e* show the optical thickness variation of the optical repeating units $R_1$ and $R_2$ in multilayer stacks $M_1$ and $M_2$ to obtain bandedge sharpening at the red or blue edge of the reflection band.

The following definitions and conventions are used throughout the disclosure:

Desired part of the spectrum: any continuous range of wavelengths between 400 nm and 2500 nm, also called desired reflection band.

Optical repeating unit (ORU): a stack of layers arranged in a particular order, which arrangement is repeated across the thickness of a multilayer film; the stack of layers have a first order reflection at a wavelength according to Formula (I) above.

Intrinsic bandwidth, or optical repeating unit (ORU) bandwidth: The bandwidth that an infinite stack of ORU's of identical thickness would exhibit, which is readily calculated from the matrix elements of the characteristic matrix M as defined by Born and Wolf, "Principles of Optics", Edition 5, page 67. For a quarterwave stack of two materials with an index differential less than about 0.3, it is given, to a good approximation, by the absolute value of the Fresnel reflection coefficient for that interface.

Stopband: A reflectance band is defined in general as a spectral band of reflection bounded on either side by wavelength regions of low reflection. With dielectric stacks, the absorption is typically low enough to be ignored for many applications, and the definition is given in terms of transmission. In those terms, a reflectance band or stop band is defined in general as a region of low transmission bounded on both sides by regions of high transmission.

In one preferred embodiment, a single reflectance band or stop band for p-polarized light has a continuous spectrum between any two successive wavelengths at which the transmission is greater than 50 percent, and including such successive wavelengths as endpoints, and where the average transmission from one endpoint to the other is less than 20 percent. Such preferred reflectance band or stop band is described in the same way for unpolarized light and light of normal incidence. For s-polarized light, however, the transmission values in the preceding description are calculated in a way that excludes the portion of light reflected by an air interface with the stack or the stack's skin layers or coatings.

Bandwidth of stop band: For such a preferred embodiment as described in the preceding paragraph, the bandwidth is defined to be the distance, in nm, between the two wavelengths within the band which are nearest each 50 percent transmission point, at which the transmission is 10 percent. In commonly used terms, the bandwidths are defined by the 10 percent transmission points. The respective blue and red (i.e., short and long wavelength) bandedges are then taken to be the wavelength at the above defined 10% transmission points. The transmission of the preferred stop band is taken to be the average transmission between the 10 percent transmission points; If a reflectance band does not have high enough reflectivity to satisfy the definitions of bandwidth and bandedge slope for the preferred embodiment, then the bandwidth may be taken simply to be the full width at half maximum (FWHM) where the maximum is the peak reflectance value.

Bandedge slope of stop band: The slope of a band edge as described in the preceding paragraph is taken from the 50 percent and 10 percent transmission wavelength points, and is given in units of percent transmission per nm.

Pass band: A pass band is defined: in general as a spectral transmitting band bounded by spectral regions of relatively low transmission. With the multilayer color shifting film, the passband is bounded by reflective stopbands. The width of the pass band is the Full Width at Half Maximum Transmission (FWHM)value.

Bandedge slope of pass band: Band edge slopes are calculated from the two points on a given bandedge nearest the maximum transmission point, the transmission values of which are 50 and 10 percent of the maximum transmission value. In one preferred embodiment, the passband has low transmission regions on both sides of the transmission peak with transmission minima of 10 percent or less of the transmission value of the peak transmission point. For example, in this preferred embodiment, a pass band having: a 50 percent transmission maximum, would be bounded on both sides by reflectance bands having 5 percent or lower transmission minima. More preferably, the transmission minima on both sides of the passband are less than 5 percent of the peak transmission value of the passband.

Edge filter: reflectance filter having only one bandedge within the wavelength range of interest.

Multilayer film: a film comprising an optical repeating unit designed to reflect light over a particular range of wavelengths. The multilayer film may contain additional layers between the optical repeating units and which additional layers may or may riot be repeated throughout the multilayer film.

Monotonically varying layer thickness of an optical repeating unit along a multilayer film: the thickness of the optical repeating unit either shows a consistent trend of decreasing or increasing along the thickness of the multilayer film (e.g., the thickness of the optical repeating unit does not show an increasing trend along part of the thickness of the multilayer film and a decreasing trend along another part of the multilayer film thickness). These trends are independent of layer-to-layer thickness errors, which may have a statistical variance with a 1-sigma value as large as 5% or more. In addition, a local variation in the optical repeating unit may cause ripples in the layer thickness profile which is not strictly monotonic by the mathematical definition; but the ripple should be relatively small compared to the thickness difference between first and last optical repeating unit.

Maximum optical thickness of an optical repeating unit: the maximum of a statistical curve fit to the actual layer distribution containing random errors in layer thickness.

Minimum optical thickness or an optical repeating unit: the minimum of a statistical curve fit to the actual layer distribution containing random errors in layer thickness.

In-plane axes: two mutually perpendicular axes that are in the plane of the reflective film. For the sake of convenience, they are denoted as the x-axis and the y-axis.

Transverse axis: an axis that is perpendicular to the plane of the reflective film. For sake of convenience, this axis is denoted the z-axis.

An index of refraction along a particular axis is referred to as $n_i$, wherein i indicates the particular axis, for example, $n_x$, indicates an index of refraction along the x-axis.

Negative birefringence: the index of refraction along the transverse axis is less than or equal to the index of refraction along both in-plane axes ($n_z < n_x$ and $n_y$)

Positive birefringence: the index of refraction along the transverse axis is greater than the index of refraction along both in-plane axes ($n_z > n_x$ and $n_y$).

Isotropic: the indices of refraction along x, y and z-axes are substantially equal (e.g., $n_x = n_y = n_z$)

Infrared region: 700 nm to 2500 nm

Visible region: 400 nm to 700 nm

The f-ratio is defined as:

$$f_k = \frac{n_k * d_k}{\sum_{m=1}^{N} n_m d_m}$$

wherein $f_k$ is the optical thickness of polymeric layer k, 1 is the number of layers in the optical repeating unit, $n_k$ is the refractive index of polymeric layer k, and $d_k$ is the thickness of polymeric layer k. The optical thickness ratio of polymeric layer k along an optical axis j is denoted as $f_{jk}$ and is defined as above, but with replacement of $n_k$ with the refractive index of polymer material k along axis j ( ).

Skin layer: a layer that is provided as an outermost layer typically having a thickness between 10% and 20% of the sum the physical thickness of all optical repeating units.

DETAILED DESCRIPTION

The construction of multilayer films in accordance with the present invention can be used in a variety of ways to obtain bandedge sharpening at the red or blue side of the band or on both sides.

Bandedge Sharpening—Blue Edge

To obtain bandedge sharpening in accordance with the present invention at the blue edge of the reflection band, a multilayer stack $M_1$ having an optical repeating unit $R_1$ is combined with a multilayer stack $M_2$ having an optical repeating unit $R_2$. Both multilayer stacks are designed to have a first order reflection band in a desired region of the spectrum, e.g., in the infrared region. It is possible to produce a film or other optical body having a first order reflection band in a particular region of the spectrum by selecting polymeric materials with appropriate indices of refraction and by manipulating the physical thickness of each of the individual polymeric layers of an optical repeating unit such that the optical thickness of the optical repeating unit appears at the desired wavelength as predicted by Formula (I) above. By varying the optical thickness of the optical repeating unit in the multilayer film, the desired reflection over a particular range in the spectrum can be obtained. Preferably, the optical repeating unit $R_1$ of multilayer stack $M_1$ is monotonically varied in optical thickness such that the desired reflection band is obtained. However, it is also possible to use several multilayer stacks comprising different optical repeating units to cover a desired reflection band.

The optical thickness of optical repeating unit $R_1$ preferably increases monotonically along the thickness of multilayer stack $M_1$. Multilayer stack $M_2$ may comprise an optical repeating unit $R_2$ that is substantially constant in optical thickness or the optical thickness of optical repeating unit $R_2$ may decrease monotonically along the thickness of multilayer stack $M_2$. If the optical thickness of optical repeating unit $R_2$ is substantially constant, the optical thickness thereof should be approximately equal to the minimum optical thickness of optical repeating unit $R_1$ along the thickness of multilayer stack $M_1$. Preferably in this embodiment, the optical thickness of optical repeating unit $R_2$ is substantially equal to the minimum optical thickness of optical repeating unit $R_1$.

FIG. 1a depicts this embodiment and shows a plot of the optical thickness of optical repeating units $R_1$ and $R_2$ versus the optical repeating unit number in a reflective film made in connection with the present invention. In FIG. 1a, multilayer stack $M_1$ comprises optical repeating unit $R_1$ of increasing optical thickness, and multilayer stack $M_2$ comprises optical repeating unit $R_2$ of substantially constant optical thickness. A reflective film designed in accordance with FIG. 1a will have a sharpened bandedge on the blue side of the reflection band.

Figure 1B:
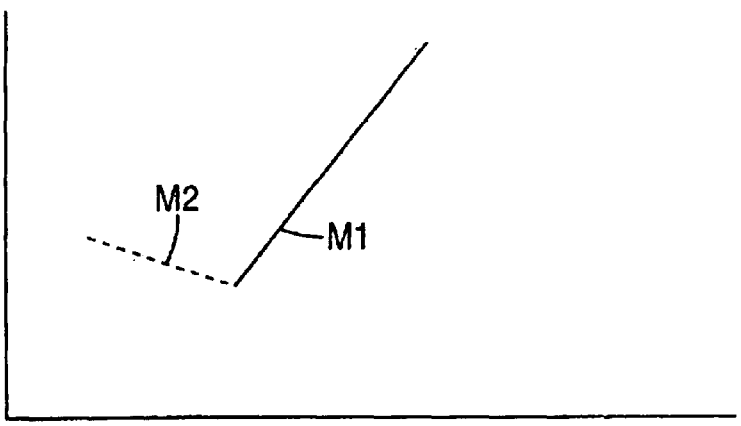

FIG. 1b depicts another embodiment of the present invention that also leads to sharpening of the reflection band on the blue side. As shown in FIG. 1b, multilayer stack $M_2$ in this embodiment comprises an optical repeating unit $R_2$ that decreases monotonically in optical thickness along the thickness of multilayer stack $M_2$. The minimum optical thickness of optical repeating unit $R_2$ in this embodiment is such that it is substantially equal to the minimum optical thickness of optical repeating unit $R_1$ along multilayer stack $M_1$.

Bandedge Sharpening—Red Edge

To obtain bandedge sharpening in accordance with the present invention at the red end of the reflection band, a multilayer stack $M_1$ having an optical repeating unit $R_1$ is combined with a multilayer stack $M_2$ having an optical repeating unit $R_2$. Both multilayer films are designed to have a first order reflection in a desired portion of the spectrum, e.g., a reflection band in the green part of the visible spectrum.

The optical thickness of optical repeating unit $R_1$ preferably increases monotonically along the thickness of multilayer stack $M_1$. Multilayer stack $M_2$ may comprise an optical repeating unit $R_2$ that is substantially constant in optical thickness, or else the optical thickness of optical repeating unit $R_2$ may decrease monotonically along the thickness of multilayer stack $M_2$. If the optical thickness of optical repeating unit $R_2$ is substantially constant, the optical thickness thereof should be equal to the maximum optical thickness of optical repeating unit $R_1$ along the thickness of multilayer stack $M_1$. Preferably in this embodiment, the optical thickness of optical repeating unit $R_2$ is substantially equal to the maximum optical thickness of optical repeating unit $R_1$.

Figure 1C:
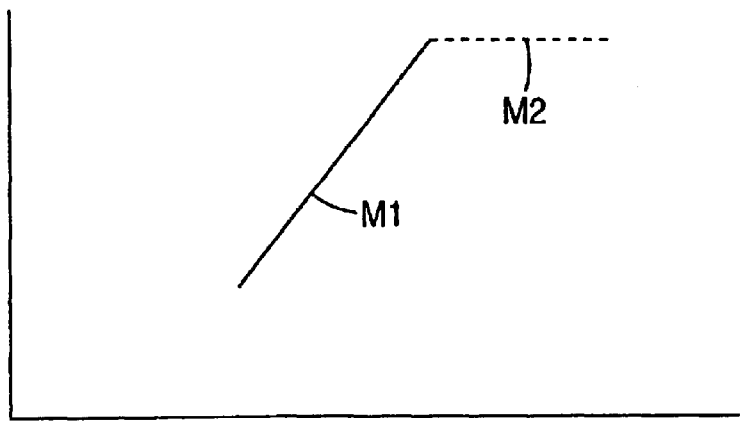

FIG. 1c depicts this embodiment and shows a plot of the optical thickness of optical repeating units $R_1$ and $R_2$ versus the optical repeating unit number in a reflective film body in connection with the present invention. In FIG. 1c; multilayer stack $M_1$ comprises optical repeating unit $R_1$ of increasing optical thickness, and multilayer stack $M_2$ comprises optical repeating units $R_2$ of substantially constant optical thickness. A reflective film body designed in accordance with FIG. 1c will exhibit a sharpened bandedge at the red end of the reflection band.

Figure 1D:
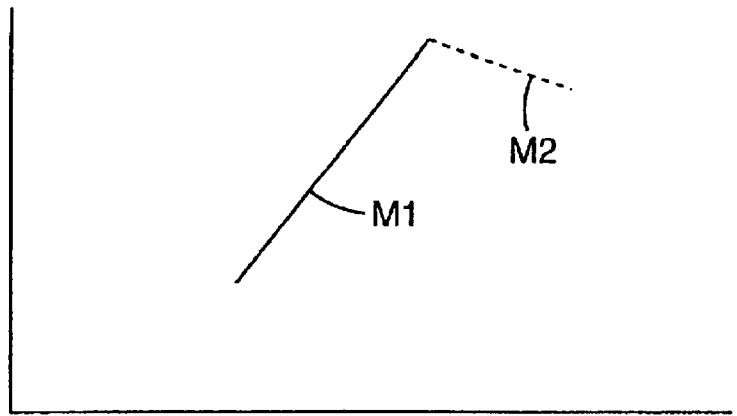

FIG. 1d depicts another embodiment of the present invention that also leads to sharpening of the reflection band on the red side. As shown in FIG. 1d, multilayer stack $M_2$ now comprises an optical repeating unit $R_2$ that decreases monotonically in optical thickness along the thickness of multilayer stack $M_2$. The maximum optical thickness of optical repeating unit $R_2$ in this embodiment is such that it is substantially equal to the maximum optical thickness of optical repeating unit $R_1$ along multilayer stack $M_1$.

Bandedge Sharpening—Both Edges

Figure 2:
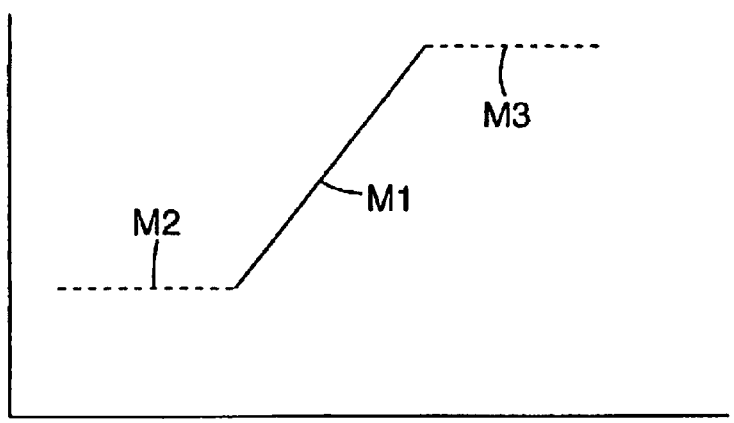
FIG. 2 shows the optical thickness variation of the optical repeating units $R_1$, $R_2$ and $R_3$ in multilayer films $M_1$, $M_2$ and $M_3$ to obtain bandedge sharpening at the blue and red edges of the reflection band.

To obtain bandedge sharpening at both ends of the reflection band, three multilayer stacks $M_1$, $M_2$ and $M_3$ can be combined as in the embodiment shown in FIG. 2. There, multilayer stack $M_1$ comprises an optical repeating unit $R_1$ that monotonically increases along the thickness of multilayer stack $M_1$. At the end of the stack, where $R_1$ has the minimum optical thickness, multilayer stack $M_1$ is combined with multilayer stack $M_2$ that comprises optical repeating unit $R_2$ having a constant optical thickness. The optical thickness of $R_2$ is either substantially equal (as shown in FIG. 2) or is less than the minimum optical thickness of optical repeating unit $R_1$. As already described above for obtaining bandedge sharpening at the blue edge of the reflection band, optical repeating unit $R_2$ can also decrease monotonically along the thickness of multilayer stack $M_2$.

At the end of the stack where optical repeating unit $R_1$ has its maximum optical thickness, there is combined a multilayer film $M_3$ comprising an optical repeating unit $R_3$ that has a substantially constant optical thickness. As shown in FIG. 2, the optical thickness of $R_3$ is equal to the maximum optical thickness of optical repeating unit $R_1$. As already described above for obtaining bandedge sharpening at the red end, optical repeating unit $R_3$ can also decrease monotonically along the thickness of multilayer film $M_3$.

Figure 1E:
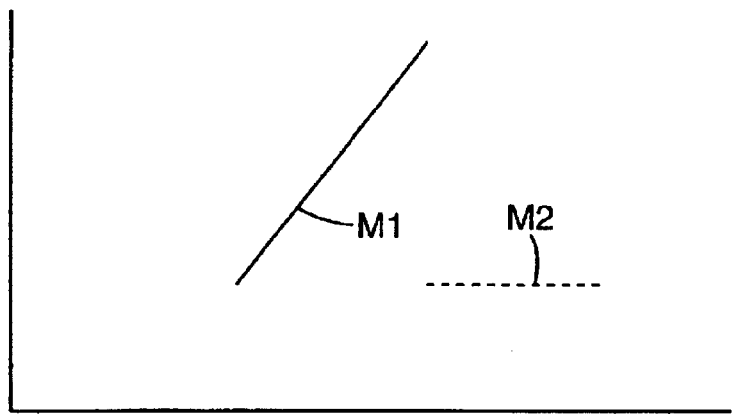

In each of the above described embodiments, the multilayer stacks $M_1$ and $M_2$ and, optionally, $M_3$ have been described as being physically next to each other in the reflective film. However, this is not a requirement. In particular, the multilayer stacks may be spaced away from each other in the reflective film body by additional multilayer stacks and/or additional layers such as, for example, a layer which improves the adherence between the multilayer stacks. For example, multilayer stack $M_2$ in FIG. 1a could equally well be present at the other end of multilayer stack $M_1$ as shown in FIG. 1e. Similarly, the positions of multilayer stacks $M_2$ and $M_3$ in FIG. 2 can be interchanged as well. However, the preferred spatial positions of the multilayer stacks $M_1$, $M_2$ and, optionally, $M_3$ relative to each other is that they join together such that adjacent layers are of approximately equal optical thickness as illustrated in FIGS. 1a–1d and 2, with no intervening material layers or spaces.

Bandedge sharpening can be obtained even if the multilayer stacks $M_1$, $M_2$, and $M_3$ are not adjacent or in the order illustrated in FIG. 1e. The materials and their indices may even be different in each of the three multilayer stacks. However, the most efficient use of optical layers will occur when repeat units of the same or similar optical thickness (multilayer stacks having overlapping reflection bands) are optically coupled to enhance constructive interference between those layers. This constraint also provides a guideline for the range of useful thicknesses of repeat units $R_1$, $R_2$ and $R_3$ in multilayer stacks $M_1$, $M_2$ and $M_3$. For example, in FIG. 1d, as the repeat units in multilayer stack $M_2$ get progressively thinner to the right, with progressive deviation from the thickness of the maximum repeat unit of $M_1$, the optical coupling for constructive interference is progressively weakened between those layers at the extremities. If the minimum thickness repeat unit of $M_2$ is of optical thickness d that is outside of the intrinsic bandwidth of the maximum thickness repeat unit in $M_1$, then that minimum thickness unit will not contribute appreciably to bandedge sharpening on the red side of the reflection band of multilayer $M_1$.

A reflective film or other optical body made in accordance with the present invention can be manufactured, for example, by multilayer co-extrusion as described in more detail below. Alternatively, the multilayer stacks forming the reflective films or other optical bodies of the present invention may be manufactured separately from each other (e.g., as separate, free-standing films) and then laminated together to form the final reflective film.

Optical Stack Designs

Layer thickness distributions for extended reflection bands may take the form of a variety of exponentially or linearly increasing functional forms. Such optical stacks create an extended reflection band of pre-determined bandwidth and extinction. If the same functional form is maintained from beginning to end (first to last layer), then the slopes of the bandedges may not be as steep as desired. To increase the slope of either the left or right bandedge, the functional form of the layer thickness distribution may change near the end points of the primary stack distribution such that the slope of the layer thickness distribution approaches zero.

Figure 3:
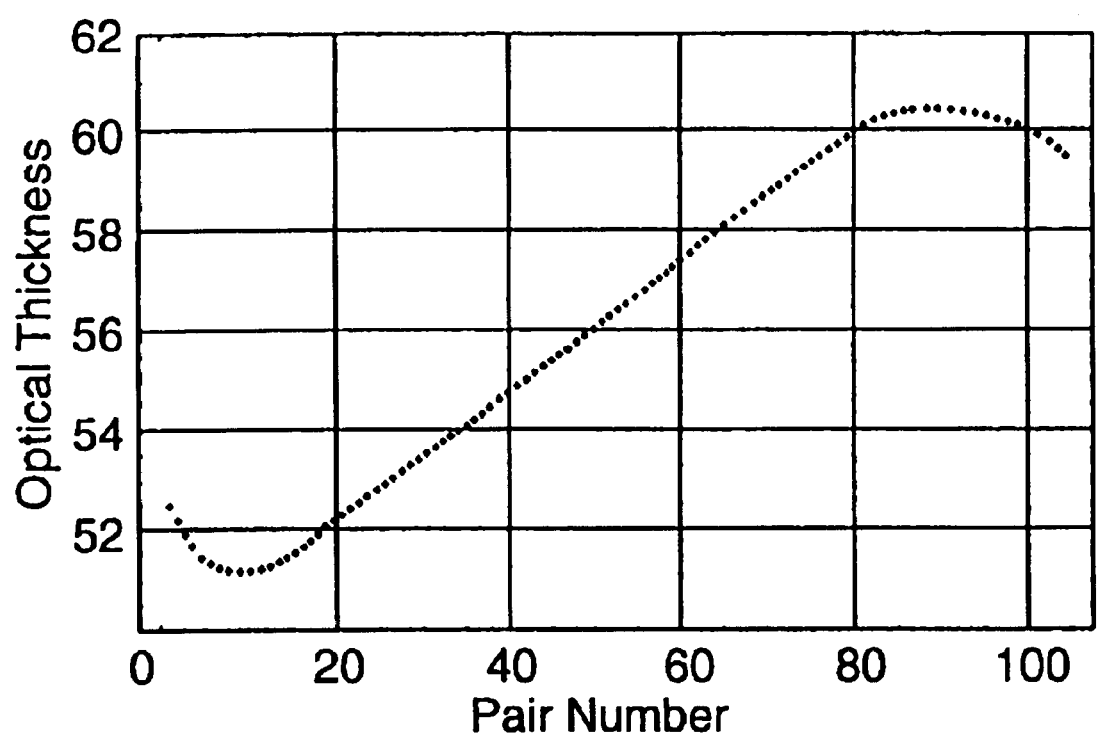
FIG. 3 shows the optical thickness variation of the optical repeating units $R_1$, $R_2$ and $R_3$ in multilayer films $M_1$, $M_2$ and $M_3$ in which $M_1$ and $M_3$ have continuously changing slopes.

To further sharpen the bandedges, additional layers with zero or opposite sign slopes may be added. For example, combined multilayer optical stacks $M_1$, $M_2$, and $M_3$ can be constructed as shown in FIG. 3 in which there are no discontinuities in the first derivative of the (statistically averaged) layer thickness profile. In FIG. 3, $M_2$ itself has a slight band sharpening profile in that the slope at the beginning and end of $M_2$ is equal to zero. Stacks $M_1$ and $M_3$ are designed such that they also have zero slopes where they join $M_2$. The slopes of both $M_1$ and $M_3$ change continuously until, at their endpoints, their slopes are equal and opposite to that of the main stack $M_2$. In FIG. 3, $M_1$ consists of repeat units 1 to 10, $M_2$ of units 10 to 90, and $M_3$ of units 90 to 105. $M_2$ itself consists of 3 regions: $M_{21}$, $M_{22}$, and $M_{23}$, similar to the profile in FIG. 2. $M_{21}$ consists of units 10 to 20, $M_{22}$ from 20 to 80, and $M_{23}$ from 80 to 90. $M_{22}$ is a linear thickness profile.

Furthermore, the combined distribution curve $M_1+M_2+M_3$ may be part of a larger optical stack and can be in an interior or on the exterior position of a larger stack. Thus, films and other optical bodies can be made in accordance with the present invention whose total constructions contain multiple reflecting bands created by multiple sets of layer thickness gradients, all with their respective bandedge sharpening layer groups.

Typically, the optical thickness variation of an optical repeating unit in accordance with the present invention can be obtained by varying the physical thickness of the polymeric layers of the optical repeating unit. The optical thickness of a repeat unit is selected according to the wavelengths selected to be reflected. Any range of wavelengths outside of the intrinsic bandwidth of the optical repeating unit can be selected by addition of optical repeating units having the appropriate range of optical thicknesses. According to one particular embodiment in connection with the present invention, the physical thickness of all polymeric layers constituting the optical repeating unit is varied at the same rate. For example, all polymeric layers of the optical repeating unit may be varied in thickness according to the same linear function.

In an alternative embodiment of the present invention, the physical thickness of the polymeric layers of the optical repeating unit may be varied differently. This is particularly preferred where it is desirable to obtain an optical thickness variation of the optical repeating unit $R_2$ or $R_3$ of multilayer films $M_2$ and $M_3$, respectively. For example, the optical thickness of an optical repeating unit consisting of two alternating polymeric layers may be monotonically varied in accordance with the present invention by keeping the physical thickness of one of the layers substantially constant while varying the physical thickness of the other layer in accordance with, for example, a linear function. Alternatively, both layers can be varied in physical thickness but in accordance with different functions, e.g., different linear functions or different subtile power law functions.

Several preferred embodiments of the present invention are illustrated in Table I and in the examples which follow. Table I lists four separate layer thickness gradients. Each gradient is comprised of repeating quarter wave layers of a high index material (n=1.75) and a low index polymer (n=1.50). The starting thickness and the thickness increment for each successive layer is provided. A computer modeling program was used to investigate the effect of several combinations of gradients on the bandedge steepness of the primary reflectance band.

TABLE I

|  | LTG1 | LTG2 | LTG3 | LTG4 | LTG5 |
| --- | --- | --- | --- | --- | --- |
| Total number of layers | 170 | 30 | 30 | 30 | 30 |
| High index beginning layer thickness (nm) | 154.6 | 112.4 | 112.4 | 112.4 | 112.4 |
| High index layer thickness increment (nm) | −0.4965 | 0.726 | 0.726 | 0 | 0.726 |
| Low index beginning layer thickness (nm) | 183.3 | 133.3 | 133.3 | 133.3 | 133.3 |
| Low index layer thickness increment (nm) | −0.5882 | 0.8608 | 0 | 0 | −0.5882 |

EXAMPLE 1

Reverse Gradient

Figure 7A:
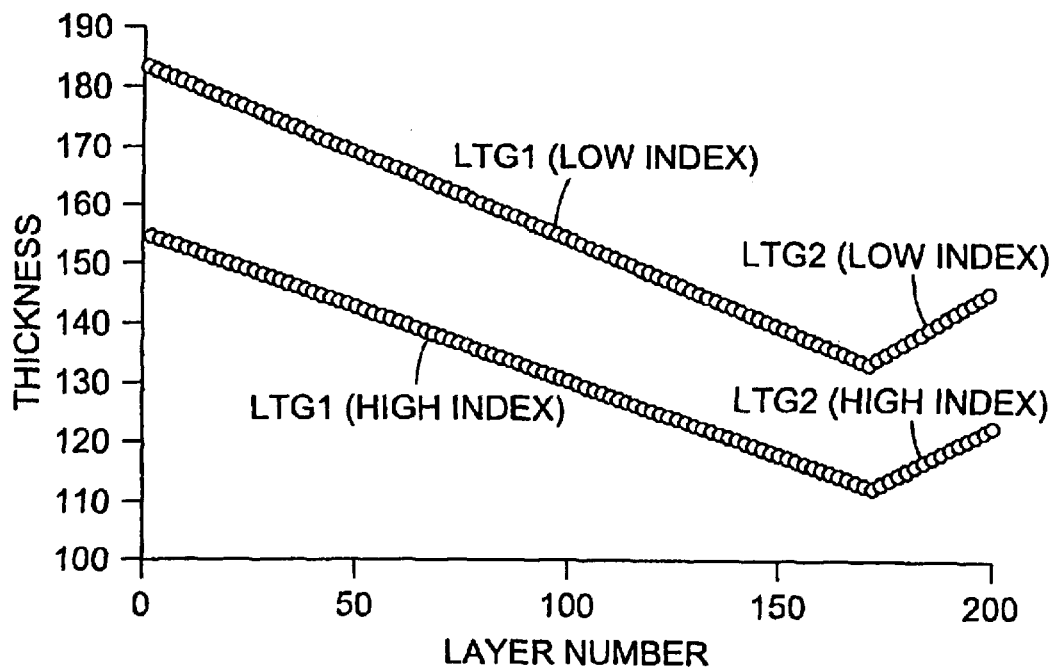
FIG. 7a is a layer thickness gradient profile showing a combined layer thickness gradient of LTG1 and LTG2.

An example of a reverse gradient is shown in FIG. 7a. This figure shows the combined layer thickness gradient of LTG1 and LTG2. In this case, the bandedge sharpening gradient, LTG2, consists of 30 layers of alternating high and low index materials, both of which increase in thickness to maintain an f-ratio of 0.5 from the first to last layer pair.

Figure 7B:
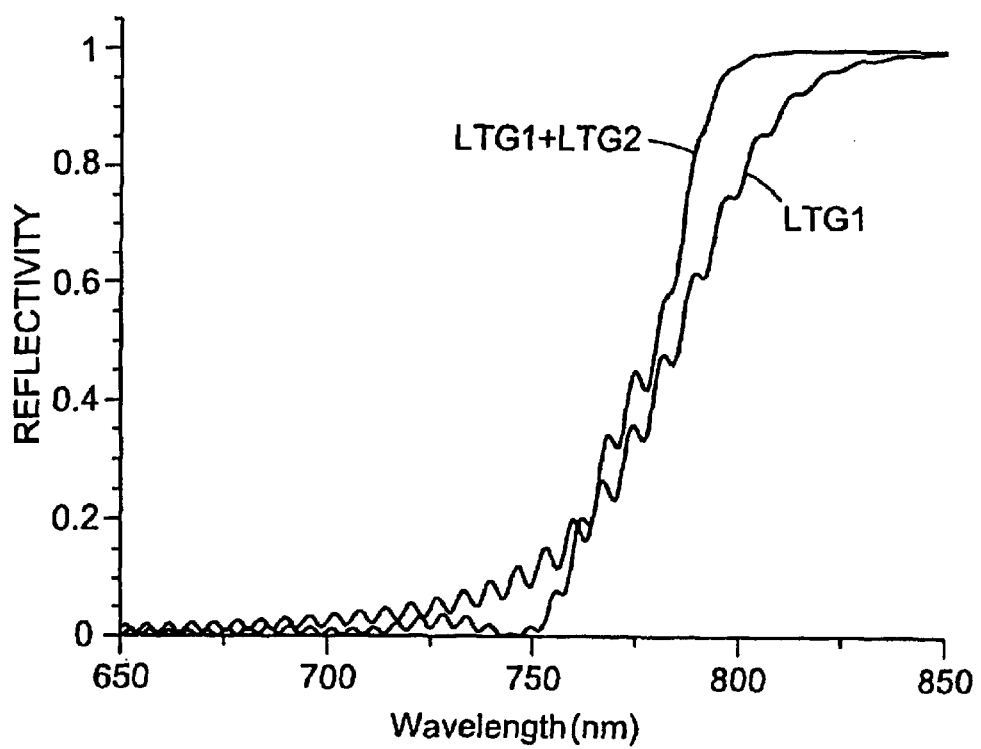
FIG. 7b is a computed spectrum illustrating the short wavelength bandedge for the reflectance band created by layer thickness gradient LTG1 and the effect of adding the reverse gradient LTG2.

Another example of a reverse layer gradient is shown in FIG. 7b. This figure shows the short wavelength bandedge for the reflectance band created by layer thickness gradient LTG1 and the effect of adding the reverse gradient LTG2. The addition of LTG2 results in an increase to the edge slope. The bandedge slope without the addition of LTG2 is 1.1 percent/nm. When LTG2 is added, the slope increases to 1.9 percent/nm. The layer thickness profiles are shown in FIG. 7a.

EXAMPLE 2

Reverse Gradient with f-ratio Deviation

Figure 8A:
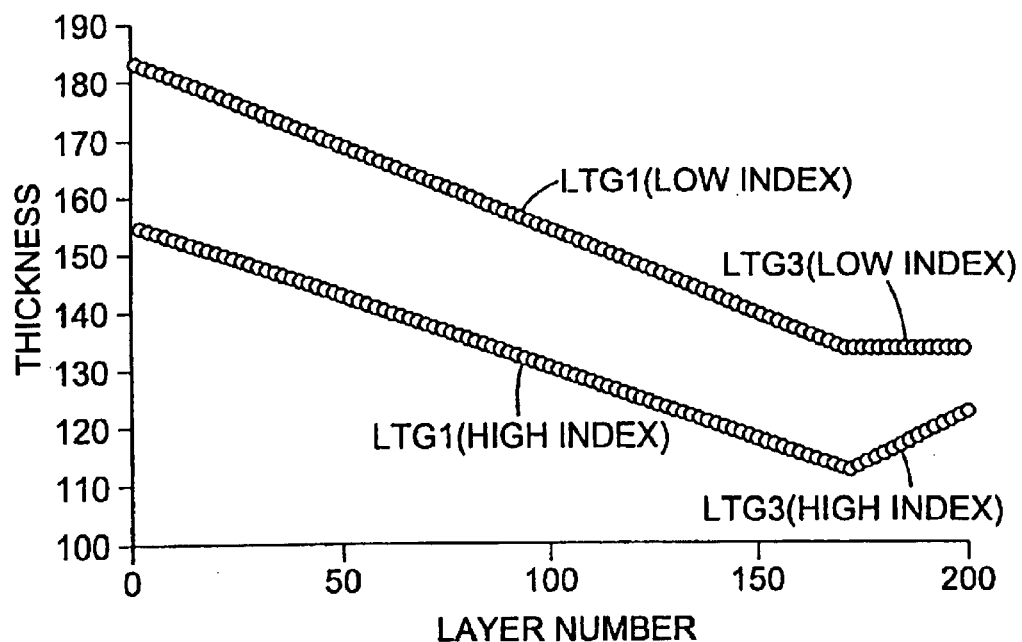
FIG. 8a is a layer thickness gradient profile of a stack design having a reverse gradient with an f-ratio deviation.
Figure 8B:
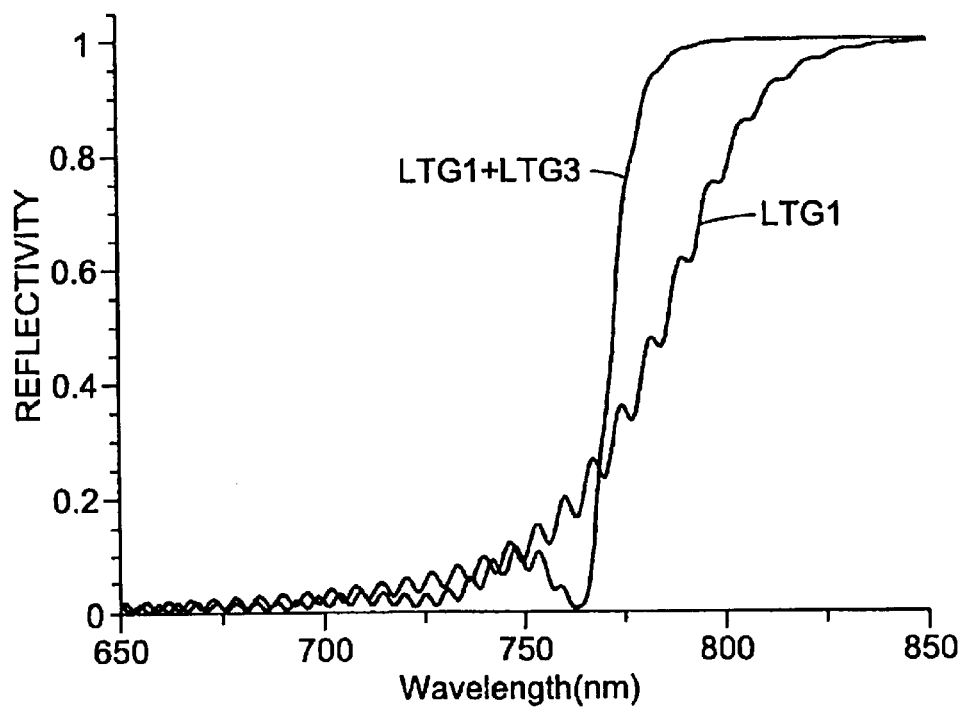
FIG. 8b is a computational spectrum illustrating the improvement in bandedge sharpness afforded by the combination of LTG1 and LTG3.

An example of a stack design having a reverse gradient with an f-ratio deviation is shown in FIG. 8a. This figure shows a film stack design of only one material component with a reverse thickness gradient while the other has a zero gradient in the added band sharpening stack of LTG3. This combination of LTG1 and LTG3 also shows an improvement in bandedge sharpness over the LTG1 case as seen in FIG. 8b below. The bandedge slope with LTG3 added is 7.3 percent/nm.

EXAMPLE 3

Zero Gradient

This example demonstrates bandedge sharpening for the case of zero gradient stacks LTG4 for both materials. The stack design of this example also produces a much sharper bandedge than LTG1 alone. The bandedge slope in this case is 3.6 percent/nm.

Figure 9A:
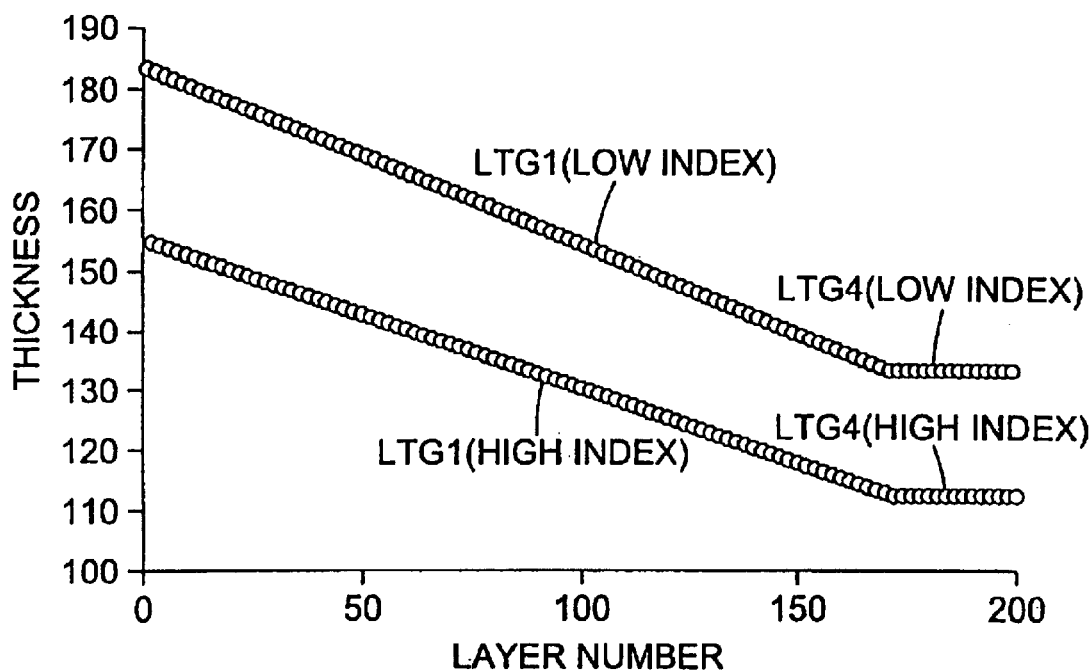
FIG. 9a is a layer thickness gradient profile for the combined stacks LTG1 and LTG4.
Figure 9B:
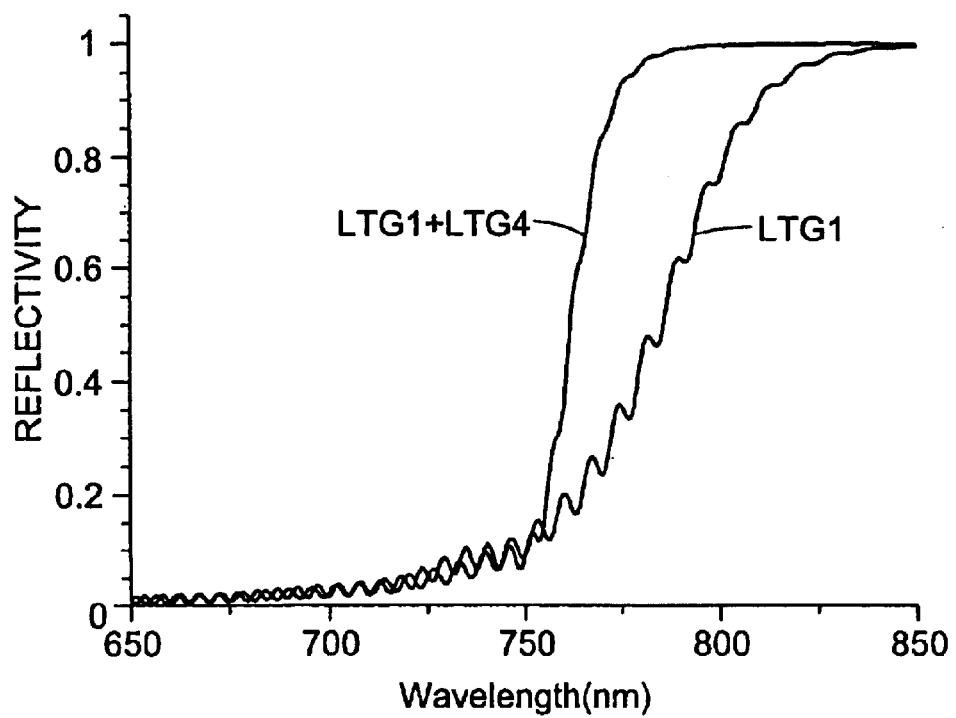
FIG. 9b is a computational spectrum illustrating the improvement observed with the layer thickness gradient of FIG. 9a compared to the LTG1 case.

FIG. 9a shows the layer thickness gradient for the combined stacks LTG1 and LTG4. LTG4 has a zero thickness gradient for both materials, and maintains a constant ratio of thickness between the high and low index layers. Again, as shown in FIG. 9b,substantial improvement is seen compared to the LTG1 case, with a bandedge slope of 3.6 percent/nm compared to the value of 1.1 percent per nm for LTG1.

EXAMPLE 4

Gradient Sign Change by Only one Component

Figure 10A:
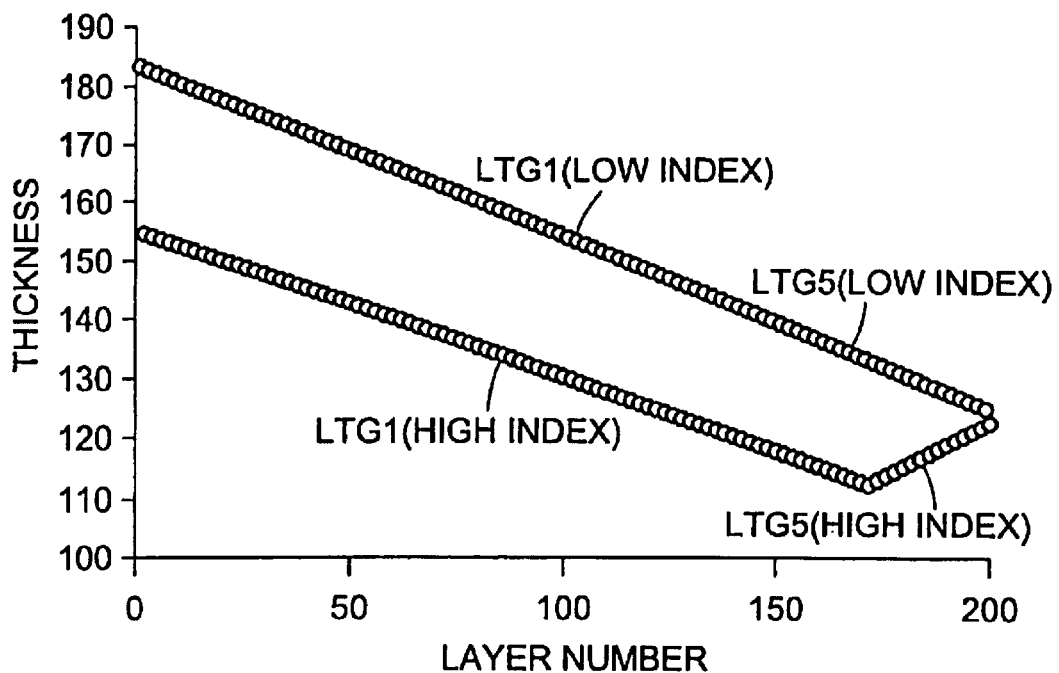
FIG. 10a is a the layer thickness gradient profile in which the low index layer is linear for the entire stack for LTG1 and LTG5, but the high index component undergoes a gradient reversal in the LTG5 section.
Figure 10B:
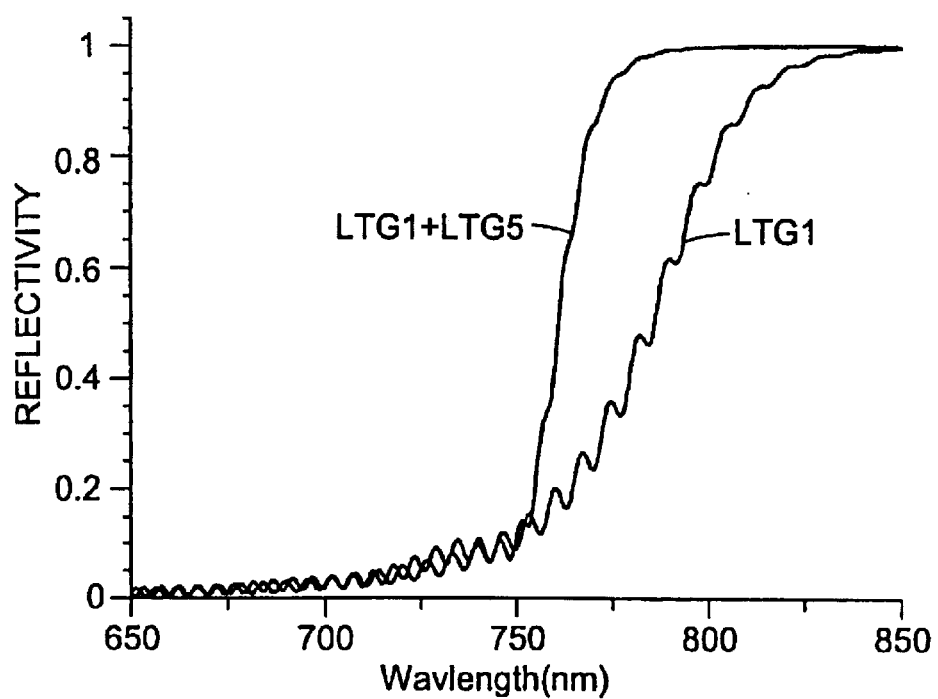
FIG. 10b is a computational spectrum illustrating the improvement seen with the gradient of FIG. 10a vs. the LTG1 case.

In this case, the layer gradient for the low index layer is linear for the entire stack for LTG1 and LTG5, but the high index component undergoes a gradient reversal in the LTG5 section, as shown in FIG. 10a below. The resulting spectra are shown in FIG. 10b, and a substantial improvement is seen vs. the LTG1 case, with the bandedge slope increasing from 1.1 percent/nm to 3.6 percent/nm.

Band Pass Filters

The fabrication of narrow bandpass transmission filters, sometimes referred to as notch filters, can be made by using two broad reflection bands which cover most of the appropriate spectrum except for a very narrow band between their adjacent bandedges. If the band pass filter is to be of both narrow band and high transmission, then nearly vertical bandedges are required. Typical design techniques of the prior art, in which individual layer thicknesses of each layer in the stack is assigned a unique value, may be impractical for polymeric stacks involving hundreds of layers. The edge sharpening techniques described herein are particularly useful in this case.

One preferred embodiment involves the use of band sharpening stacks having continuously varying gradients. The resulting band pass filters have a higher transmission than filters made with linear (constant gradient) layer thickness distributions. The following computer modeled examples illustrate this improvement.

Figure 11A:
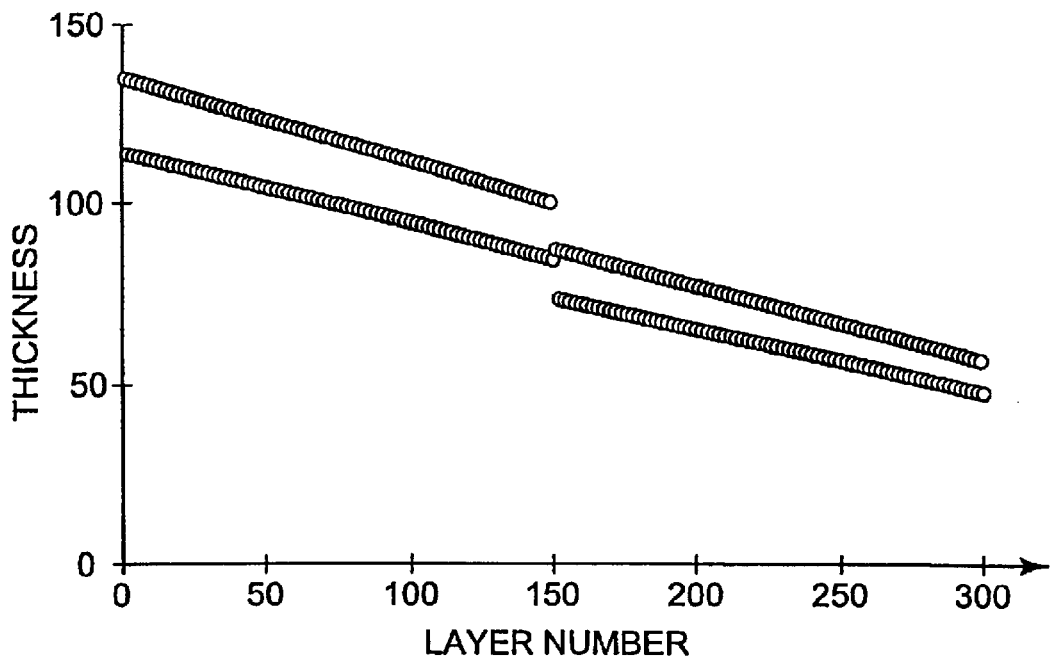
FIG. 11a is a layer thickness gradient profile for a simple band pass filter made by introducing a step discontinuity in the layer thickness profile of a broad band reflecting stack.
Figure 11B:
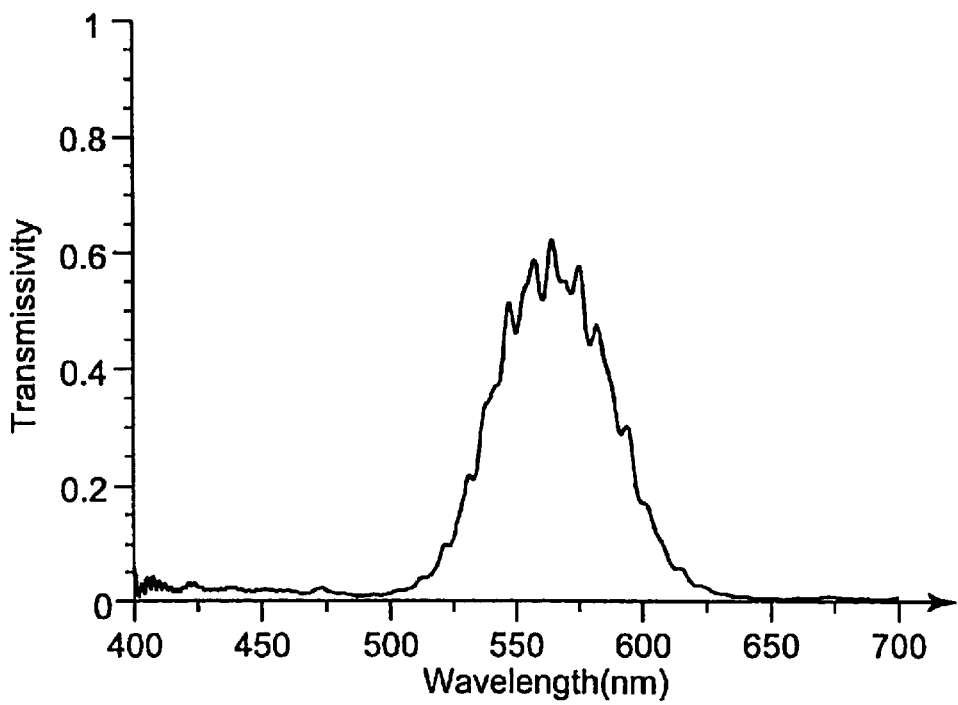

FIG. 11a. A simple band pass filter can be made by introducing a step discontinuity in the layer thickness profile of a broad band reflecting stack, as illustrated in FIG. 11a. The calculated spectrum of such a notch filter, made with the two simple linear thickness distributions of FIG. 11a, is shown in FIG. 11b. Without the band sharpening techniques described above, the bandedge slopes are not high enough to make a narrow band notch filter. The bandedges slopes are about 1.2 percent/nm and 1.4 percent/nm for the blue and red edges, respectively. The Bandwidth is 54 nm and the peak transmission value is 62 percent.

Figure 12A:
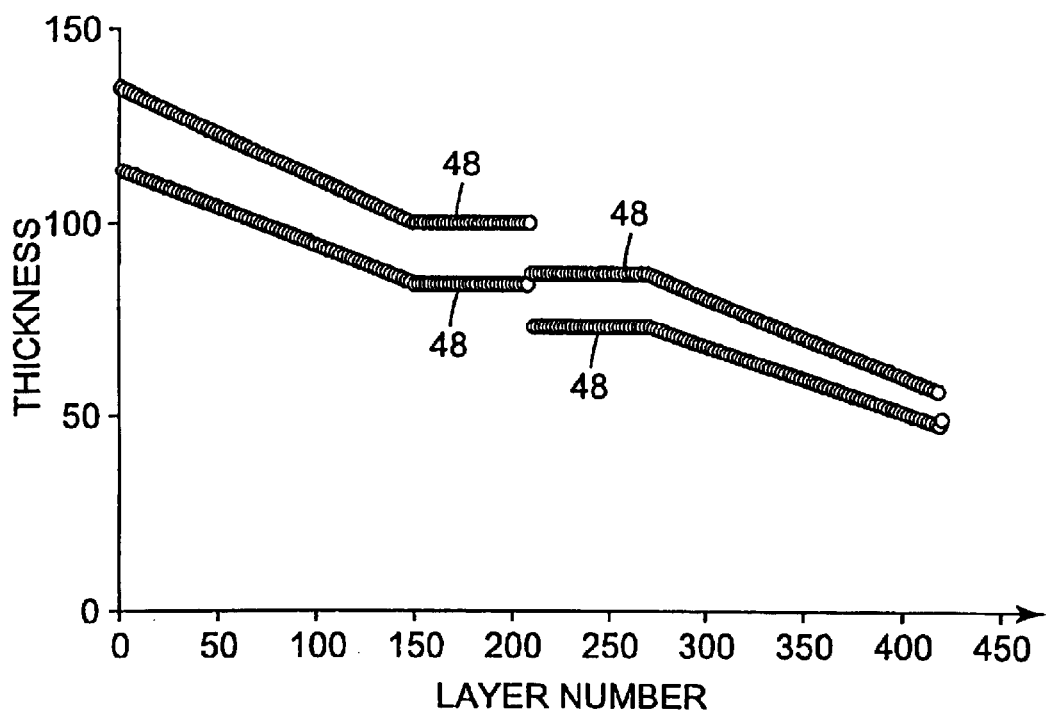
FIG. 12a is a layer thickness gradient profile made with two graded linear thickness distributions and an additional non-graded quarter wave stack.

A notch filter can be made with two graded linear thickness distributions and additional non-graded quarter wave stacks as shown in FIG. 12a. The flat (zero gradient) sections 48 are useful for sharpening the respective bandedges of the adjacent reflecting bands. With the additional layers concentrated at the two thickness values on either side of the notch wavelength, a much sharper transmission band can be made. The calculated spectrum for the illustrated stack is given in FIG. 12b. The steepness of the bandedges of the notch filter spectrum of FIG. 12b will increase with the number of layers included in the band sharpening feature of the stack, as illustrated in FIG. 12a. The bandedge slopes are about 9 percent/nm for both the blue and red edges. The Bandwidth is 13.8 nm and the peak transmission value is 55.9 percent.

Figure 12B:
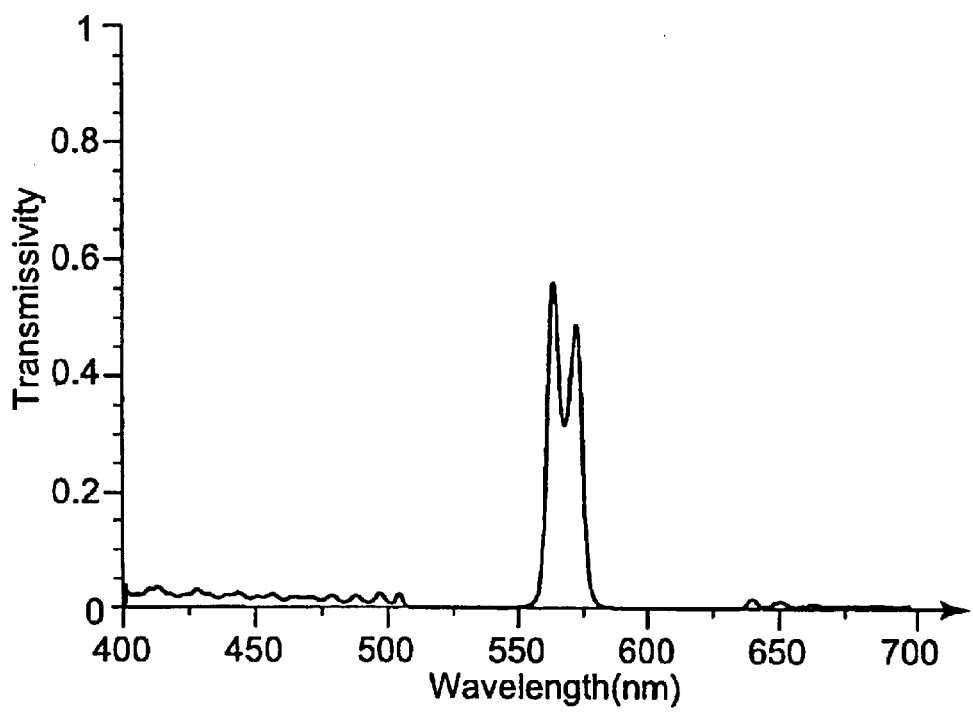
Figure 13A:
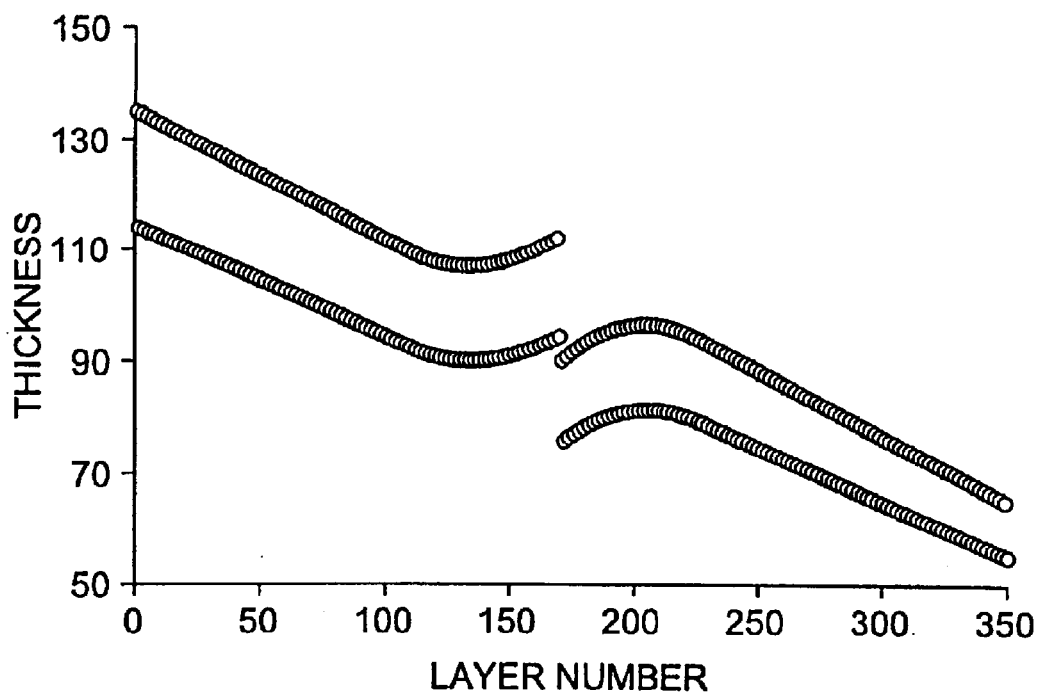
FIG. 13a is a layer thickness gradient profile illustrating a curved layer thickness profile.
Figure 13B:
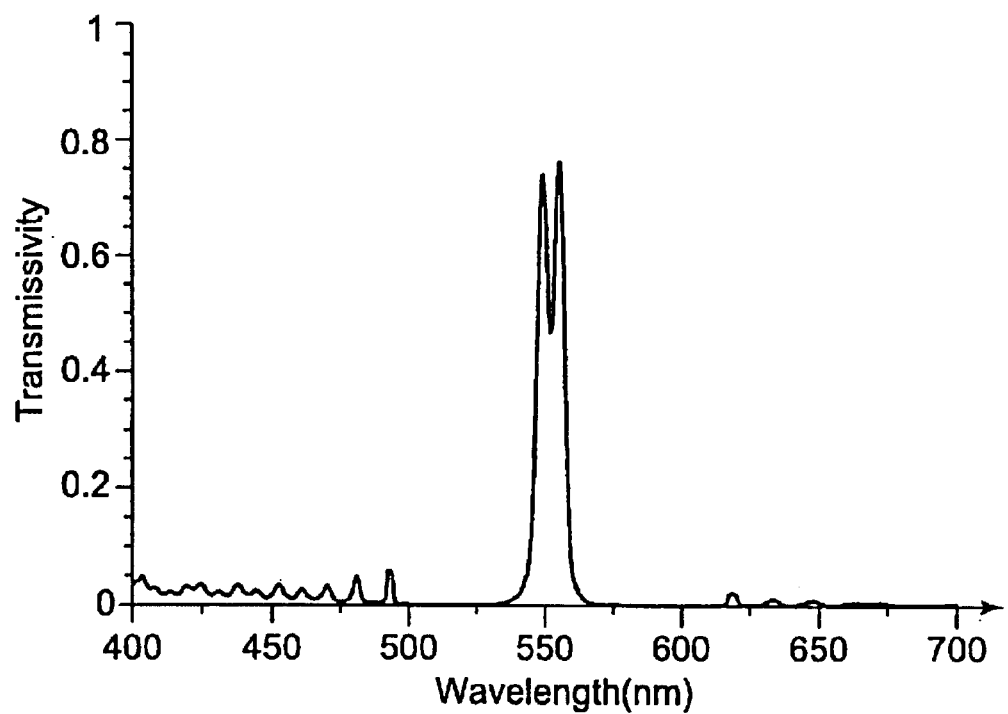

The curved layer thickness profile of FIG. 13a was created to improve upon a deficiency of the stack design and spectrum of FIGS. 12a and 12b. The side band ripples of the layer thickness profiles of FIG. 12a overlap and limit the transmission of a notch filter. Note that the peak transmission of the notch band in FIG. 12b is only about 50%. By introducing a curvature to the band sharpening stack thickness profile, the ringing at the edge of the spectrum of such a stack is reduced. Combining two such stacks will then make a notch filter with steeper bandedges and higher peak transmission, as illustrated by the results shown in FIG. 13b. The bandedge slopes are about 12 percent/nm and 14 percent/nm for the blue and red edges, respectively. The Bandwidth is 11 nm and the peak transmission value is 76 percent. Note that, although the bandwidth is narrower than in FIG. 12b, the maximum transmission is significantly higher. The number of layers in the band sharpening portion of the stack is 60 on each side of the thickness gap, which is the same number of layers used in the zero gradient sections of the layer distribution of FIG. 12a.

The curved profile can follow any number of functional forms. The main purpose of the form is to break the exact repetition of thickness present in a quarter wave stack with layers tuned to only a single wavelength. The particular function used here was an additive function of a linear profile (the same as used on the remainder of the reflectance band) and a sinusoidal function to curve the profile with the appropriate negative or positive second derivative. An important feature is that the second derivative of the layer thickness profile is positive for the red bandedge of a reflectance stack and negative for the blue bandedge of a reflectance stack Note that the opposite sign is required if one refers to the red and blue bandedges of a notch band. Other embodiments of the same principle include layer profiles that have multiple points with a zero value of the first derivative. In all cases here, the derivatives refer to those of a best fit curve fitted through the actual layer thickness profile which can contain small statistical errors of less than 10% one sigma standard deviation in layer thickness values.

As illustrated by the above examples, the band sharpening profiles that are added to the layer thickness distribution can have significant effects on the slope of the bandedges, for one or both edges of a reflectance band, and for the edges of a pass band. Sharp bandedges and high extinction are desirable in obtaining color filters having saturated colors of high purity. Preferably for reflectance bands, the slopes of the bandedges are at least about 1 percent per nm, more preferably greater than about 2 percent per nm, and even more preferably greater than about 4 percent per nm. The same slopes are preferred for bandpass filters having a bandwidth greater than or about 50 nm. For pass band filters with a bandwidth of less than or about 50 nm, the edges are preferably greater than about 2 percent per nm, more preferably greater than about 5 percent per nm, and even more preferably, greater than about 10 percent per nm.

Design of the Optical Repeating Units

The polymeric layers of an optical repeating unit in accordance with the present invention can be isotropic or anisotropic. An isotropic polymeric layer is a layer wherein the index of refraction of the polymeric layer is the same independent of the direction in the layer, whereas in case of an anisotropic polymeric layer, the index of refraction will differ along at least two different directions. The latter type of polymeric layer is also called a birefringent layer. To describe an anisotropic polymeric layer, an orthogonal set of axes x, y and z is used as set out above in the definition section. Thus, an anisotropic polymeric layer will have at least two of the indices of refraction $n_x$, $n_y$ and $n_z$ different from each other.

In one embodiment of the present invention, optical repeating units $R_1$, $R_2$ and/or $R_3$ consists of two alternating isotropic polymeric layers that have an index of refraction differing from each other, preferably by at least about 0.05 and more preferably by at least about 0.1. More preferably, however, at least one of the two alternating polymeric layers is a birefringent layer wherein at least one of the in-plane indices $n_x$ and $n_y$ differs by at least 0.05 from the corresponding in-plane index of refraction of the other layer. According to a particular preferred embodiment in connection with the present invention, the index of refraction along the transverse axes ($n_z$) of both layers is substantially matched, i.e., the difference of the index of refraction along the z-axes between both layers is preferably less than about 0.05. Optical repeating units of this type are particularly suitable for reflecting light in the visible region of the spectrum, but may also be used for reflecting light in the infrared region of the spectrum. Optical repeating units and multilayer films having this feature have been described in detail in WO 96/19347 and WO 95/17303, which are incorporated herein by reference. In another preferred embodiment of the present invention, the transverse index of the polymer layer having the highest in-plane index is lower than the in-plane indices of the other polymer. This feature is also described in the above-cited references.

Figure 4A:
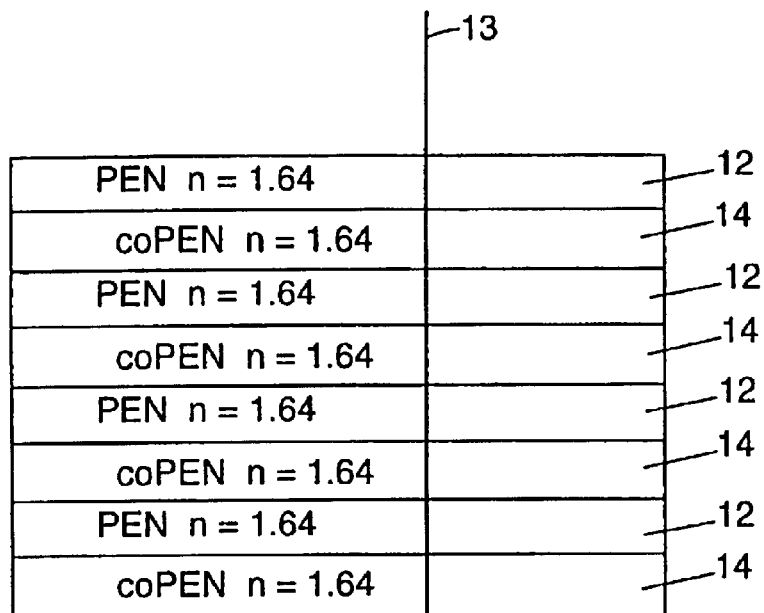
FIGS. 4a and 4b are schematic diagrams of a multilayer film consisting of two alternating polymeric layers.
Figure 4B:
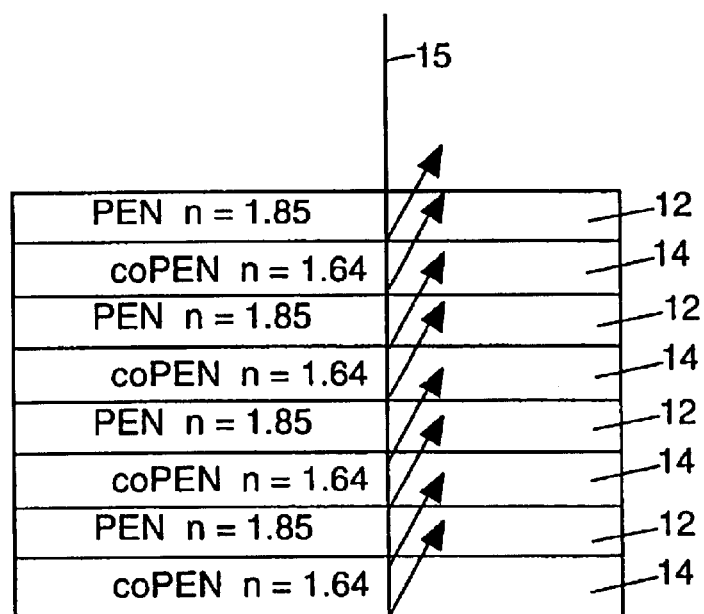

FIGS. 4a and 4b illustrate these embodiments and show a multilayer film 10 comprising an optical repeating unit consisting of two alternating polymeric layers 12 and 14. Preferably, at least one of the materials has the property of stress induced birefringence, such that the index of refraction (n) of the material is affected by the stretching process.

FIG. 4a shows an exemplary multilayer film before the stretching process in which both materials have the same index of refraction. Light ray 13 experiences relatively little change in index of refraction and passes through the film. In FIG. 4b, the same film has been stretched, thus increasing the index of refraction of material 12 in the stretch direction (or directions). The difference in refractive index at each boundary between layers will cause part of ray 15 to be reflected. By stretching the multilayer stack over a range of uniaxial to biaxial orientation, a film is created with a range of reflectivities for differently oriented plane-polarized incident light. The multilayer film can thus be made useful as reflective polarizers or mirrors. If stretched biaxially, the sheet can be stretched asymmetrically along orthogonal in-plane axes or symmetrically along orthogonal in-plane axes to obtain desired polarizing and reflecting properties.

The optical properties and design considerations of multilayer stacks comprising two alternating polymeric layers is described most completely in copending and commonly assigned U.S. Pat. No. 5,882,774, filed on Mar. 10, 1995, the disclosure of which is hereby incorporated herein by reference. Very briefly, that application describes the construction of multilayer films (mirrors and polarizers) for which the Brewster angle (the angle at which reflectance goes to zero) is very large or is nonexistent for the polymer layer interfaces. This feature allows for the construction of mirrors and polarizers whose reflectivity for p-polarized light decreases slowly with angle of incidence, is independent of angle of incidence, or increases with angle of incidence away from normality. As a result, multilayer films having high reflectivity for both s- and p-polarized light over a wide bandwidth, and over a wide range of angles, can be achieved.

Figure 5:
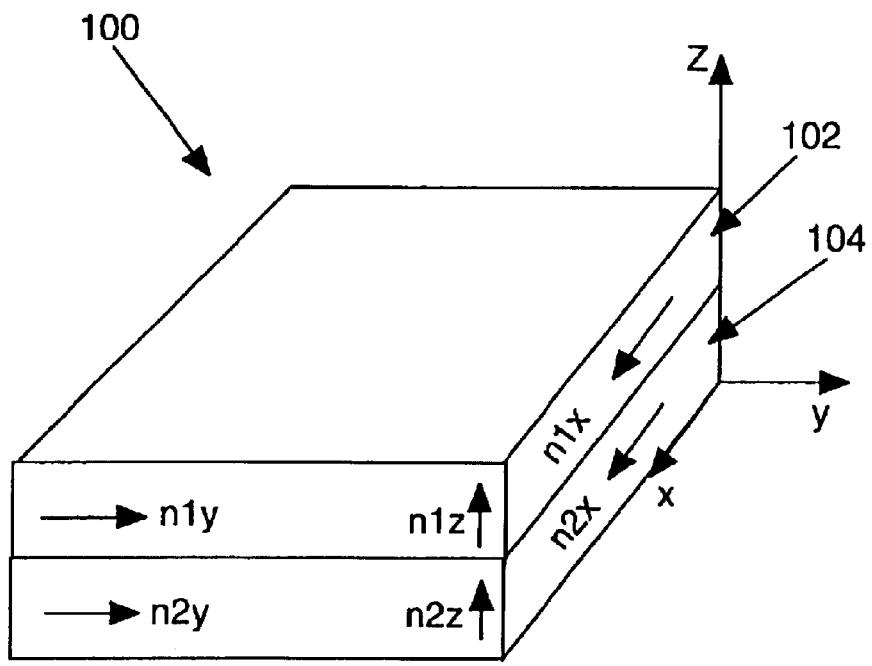
FIG. 5 is a 3-dimensional schematic diagram of an optical repeating unit consisting of two alternating layers of polymeric materials.

FIG. 5 shows an optical repeating unit 100 consisting of two polymeric layers, and indicates the three-dimensional indices of refraction for each layer. The indices of refraction are n1x, n1y, and n1z for layer 102, and n2x, n2y, and n2z for layer 104, respectively. The relationships between the indices of refraction in each film layer to each other and to those of the other layers in the film stack determine the reflectance behavior of the multilayer stack at any angle of incidence, from any azimuthal direction.

The principles and design considerations described in U.S. Pat. No. 5,882,774 can be applied to create multilayer films having the desired optical effects for a wide variety of circumstances and applications. The indices of refraction of the layers in the multilayer stack can be manipulated and tailored to produce devices having the desired optical properties. Many useful devices, such as mirrors and polarizers having a wide range of performance characteristics, can be designed and fabricated using the principles described therein.

In accordance with another embodiment of the present invention, an optical repeating unit of a multilayer film in accordance with the present invention comprises polymeric layers A, B and C having different indices of refraction. Such type of repeating unit is particularly suitable for designing an infrared reflective multilayer film. In particular, by selecting polymeric layers A, B and C such that polymeric layer B has an index of refraction intermediate that of polymeric layers A and C, an infrared reflective film can be designed for which at least two successive higher order reflections are suppressed, thus allowing the design of an infrared reflective film that is substantially transparent in the visible. A multilayer film of this type is described in detail in, e.g., U.S. Pat. No. 5,103,337, which is also incorporated herein by reference.

In accordance with this embodiment of the invention, multiple alternating substantially transparent polymeric layers A, B and C having different indices of refraction n are arranged in the order ABC. Additionally, the refractive index of polymeric layer B is intermediate the respective refractive indices of the polymeric layers A and C. In a particularly preferred embodiment having an optical repeating unit comprising polymeric layers A, B and C arranged in a pattern ABCB, and where multiple successive higher order reflections are suppressed, the optical thickness ratio $f^a$ of first material A is ⅓, the optical thickness ratio $f^b$ of second material B is ⅙, the optical thickness ratio $f^c$ of third material C is ⅓, and the index of refraction of polymeric layer B equals the square root of the product of the index of refraction of polymeric layers A and C. This particular type of optical repeating unit can be used to design a multilayer film in which reflections for the second, third, and fourth order wavelengths will be suppressed.

In accordance with a further embodiment of the present invention, the above multilayer film having an optical repeating unit comprising polymeric layers A, B and C arranged in an ABCB order can be designed using an anisotropic layer for at least one of polymeric layers A, B and C. Thus, in accordance with one embodiment of the present invention, a multilayer film that reflects light in the infrared region of the spectrum while transmitting light in the visible region of the spectrum may comprise an optical repeating unit comprising polymeric layers A, B and C arranged in an ABCB order, the polymeric layer A having refractive indices $n_x^a$ and $n_y^a$ along in-plane axes x and y, respectively, the polymeric layer B having refractive indices $n_x^b$ and $n_y^b$ along in-plane axes x and y, respectively, the polymeric layer C having refractive indices $n_x^c$ and $n_y^c$ along in-plane axes x and y, respectively, polymeric layers A, B and C having a refractive index $n_z^a$, $n_z^b$ and $n_z^c$, respectively, along a transverse axis z perpendicular to the in-plane axes, wherein $n_x^b$ is intermediate $n_x^a$ and $n_x^c$, with $n_x^a$ being larger than $n_x^c$ and/or $n_y^b$ is intermediate to $n_y^a$ and $n_y^c$, with $n_y^a$ being larger than $n_y^c$ and wherein preferably at least one of the differences $n_z^a - n_z^b$ and $n_z^b - n_z^c$ is less than 0 or both said differences are substantially equal to 0.

By designing the optical repeating unit such that at least one of the differences $n_z^a - n_z^b$ and $n_z^b - n_z^c$ is less than 0 and preferably less than −0.05, or such that both said differences are substantially 0, and while setting the index relationship along the in-plane axis between the layers as set out above, at least second and third higher order reflections can be suppressed without a substantial decrease of the infrared reflection with angle of incidence of the infrared light.

Figure 6:
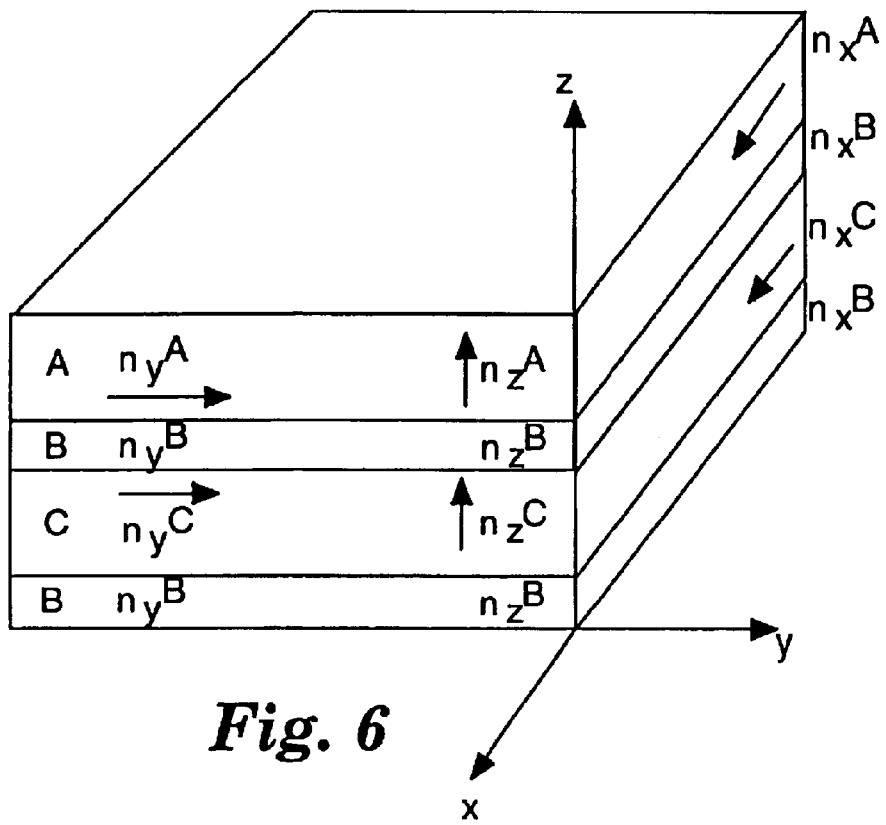
FIG. 6 is a 3-dimensional schematic diagram of an optical repeating unit consisting of polymeric layers A, B and C arranged in an ABCB pattern.

The polymeric layers A, B and C of the optical repeating unit preferably form an ABCB optical repeating unit. A schematic drawing of such a repeating unit is shown in FIG. 6. According to this embodiment, the difference of the index of refraction between layers A and B along the z-axis ($n_z^a - n_z^b$) and/or the difference of the index of refraction between layers B and C along the z-axis ($n_z^b - n_z^c$) is preferably negative, i.e., has a value less than 0, more preferably less or equal to −0.05, and most preferably less than or equal to −0.1. It is particularly preferred to design the optical repeating unit such that: one of the differences is less than 0, more preferably less than or equal to −0.05, and the other difference is either equal to 0 or less than 0. Most preferably, both difference are less than 0. Such designs, wherein one of the difference is less than 0 and the other is 0 or less than 0, yield an increase of the reflection with the angle of incidence.

It is also possible to design an optical repeating unit in accordance with the present embodiment wherein both differences are substantially 0, i.e., wherein the absolute value of the differences is preferably less than 0.03. When both differences are substantially 0, there will be little or no decrease in the infrared reflection with the angle of incidence.

According to a still further species of the present embodiment, one of the differences in refraction index between layers A and B across the z-axis is of opposite in sign to the difference of the refraction index between layers B and C across the z-axis. In the latter case, it is preferred that the difference that is less than 0 has the largest absolute value or that the absolute value of both differences is substantially equal.

By adjusting the optical thickness ratios along the particular in-plane axis that has the index of refraction for polymeric layer B intermediate that of polymeric layer A and polymeric layer C, at least two higher order reflections for infrared light having its plane of polarization parallel to that particular in-plane axis can be suppressed. It is, however, preferred that the index of refraction for polymeric layer B is intermediate that of polymeric layers A and C along both in-plane axes, and by adjusting the optical thickness ratios along both in-plane axes, an infrared reflective mirror can be obtained for which at least two successive higher order reflections are suppressed. Such an infrared reflective mirror will be substantially clear in the visible region and will be free of color.

A particularly preferred optical repeating unit for designing an infrared reflecting multilayer film in accordance with the present invention comprises polymeric layers A, B and C arranged in an ABCB pattern, with the refractive indices for polymeric layers A, B and C such that $n_x^b = (n_x^a n_x^c)^{1/2}$ and/or $n_y^b = (n_y^a n_y^c)^{1/2}$ while keeping the following optical thickness ratios: $f_x^a = 1/3$, $f_x^b = 1/6$ and $f_x^c = 1/3$ and/or $f_y^a = 1/3$, $f_y^b = 1/6$ and $f_y^c = 1/3$. Such an embodiment is capable of suppressing second, third and fourth order reflections. An infrared reflective multilayer film designed according to this embodiment can be used to reflect infrared light up to about 2000 nm without introducing reflections in the visible part of the spectrum.

Preferably, an optical repeating unit comprising polymeric layers A, B and C has, along an in-plane axis, refractive indices of polymers A, B and C different by at least 0.05. Thus, it is preferred that $n_x^a$, $n_x^b$ and $n_x^c$ differ from each other by at least 0.05 and/or that $n_y^a$, $n_y^b$ and $n_y^c$ differ from each other by at least 0.05.

The above various embodiments describing different possible designs of optical repeating units for use in the multilayer films in accordance with the present invention is not intended to be limiting to this invention. In particular, other designs of optical repeating units can be used as well. Furthermore, multilayer films comprising optical repeating units of different design can be used in combination for forming a reflective film body in accordance with the present invention. For example, a multilayer film comprising an optical repeating unit consisting of only two polymeric layers can be combined with a multilayer film comprising an optical repeating unit comprising polymeric layers A, B and C arranged in an ABC order in particular in an ABCB pattern.

One skilled in the art will readily appreciate that a wide variety of materials can be used to form (infrared) mirrors or polarizers according to the present invention when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar Theological properties (e.g., melt viscosities) so that they can be co-extruded.

In general, appropriate combinations may be achieved by selecting, for each of the layers, a crystalline, semi-crystalline, or liquid crystalline material, or amorphous polymer. It should be understood that, in the polymer art, it is generally recognized that polymers are typically not entirely crystalline, and therefore in the context of the present invention, crystalline or semi-crystalline polymers refer to those polymers that are not amorphous and includes any of those materials commonly referred to as crystalline, partially crystalline, semi-crystalline, etc.

Specific examples of suitable materials for use in the present invention include polyethylene naphthalate (PEN) and isomers thereof (e.g.,2,6-, 1,4-, 1,5-, 2,7-, and 2,3-PEN), polyalkylene terephthalates (e., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethanol diol); (f) alkane dicarboxylic acids; and/or (g) cycloalkane dicarboxylic acids (e.g., cyclohexane dicarboxylic acid)), copolymers of polyalkylene terephthalates (e.g., copolymers ofterephthalic acid, or esters thereof with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of SPS and atactic polystyrene).

Particularly preferred birefringent polymeric layers for use in the present invention include layers containing a crystalline or semi-crystalline polyethylenenaphthalate (PEN), inclusive of its isomers (e.g., 2,6-; 1,4-; 1,5-; 2,7; and 2,3-PEN). A particularly preferred isotropic polymeric layer for use in connection with this invention is a layer containing a polymethylmethacrylate, and in particular, polymethylmethacrylate itself.

It will further be understood by one skilled in the art that each of the polymeric layers may be composed of blends of two or more polymeric materials to obtain desired properties for a specific layer.

The films and other optical devices made in accordance with the invention may also include one or more anti-reflective layers or coatings, such as, for example, conventional vacuum coated dielectric metal oxide or metal/metal oxide optical films, silica sol gel coatings, and coated or coextruded antireflective layers such as those derived from low index fluoropolymers such as THV, an extrudable fluoropolymer available from 3M Company (St. Paul, Minn.). Such layers or coatings, which may or may not be polarization sensitive, serve to increase transmission and to reduce reflective glare, and may be imparted to the films and optical devices of the present invention through appropriate surface treatment, such as coating or sputter etching.

Both visible and near IR dyes and pigments are contemplated for use in the films and other optical bodies of the present invention, and include, for example, optical brighteners such as dyes that absorb in the UV and fluoresce in the visible region of the color spectrum. Other additional layers that may be added to alter the appearance of the optical film include, for example, opacifying (black) layers, diffusing layers, holographic images or holographic diffusers, and metal layers. Each of these may be applied directly to one or both surfaces of the optical film, or may be a component of a second film or foil construction that is laminated to the optical film. Alternately, some components such as opacifying or diffusing agents, or colored pigments, may be included in an adhesive layer which is used to laminate the optical film to another surface.

It is preferred that the polymers have compatible rheologies for coextrusion. That is, as a preferred method of forming the reflective film bodies is the use of coextrusion techniques, the melt viscosities of the polymers are preferably reasonably matched to prevent layer instability or non-uniformity. The polymers used also preferably have sufficient interfacial adhesion so that the films will not delaminate.

The multilayer reflective film bodies of the present invention can be readily manufactured in a cost effective way, and they can be formed and shaped into a variety of useful configurations after coextrusion. Multilayer reflective film bodies in accordance with the present invention are most advantageously prepared by employing a multilayered coextrusion device such as those described in U.S. Pat. Nos. 3,773,882 and 3,884,606, the disclosures of which are incorporated herein by reference. Such devices provide a method for preparing multilayered, simultaneously extruded thermoplastic materials, each of which are of a substantially uniform layer thickness.

Preferably, a series of layer multiplying means as are described in U.S. Pat. No. 3,759,647, the disclosure of which is incorporated herein by reference, may be employed. The feedblock of the coextrusion device receives streams of the diverse thermoplastic polymeric materials from a source such as a heat plastifying extruder. The streams of resinous materials are passed to a mechanical manipulating section within the feed block. This section serves to rearrange the original streams into a multilayered stream having the number of layers desired in the final body. Optionally, this multilayered stream may be subsequently passed through a series of layer multiplying means in order to further increase the number of layers in the final body.

The multilayered stream is then passed into an extrusion die which is so constructed and arranged that stream-lined flow is maintained therein. Such an extrusion device is described in U.S. Pat. No. 3,557,265, the disclosure of which is incorporated by reference herein. The resultant product is extruded to form a multilayered body in which each layer is generally parallel to the major surface of adjacent layers.

The configuration of the extrusion die can vary and can be such as to reduce the thickness and dimensions of each of the layers. The precise degree of reduction in thickness of the layers delivered from the mechanical orienting section, the configuration of the die, and the amount of mechanical working of the body after extrusion are all factors which affect the thickness of the individual layers in the final body.

The number of layers in the reflective film body can be selected to achieve the desired optical properties using the minimum number of layers for reasons of film thickness, flexibility and economy. In the case of both reflective polarizers and reflective mirrors, the number of layers is preferably less than about 10,000, more preferably less than about 5,000, and (even more preferably) less than about 2,000.

The desired relationship between refractive indices of polymeric layers as desired in this invention can be achieved by selection of appropriate processing conditions used to prepare the reflective film body. In the case of organic polymers which can be oriented by stretching, the multilayer films are generally prepared by co-extruding the individual polymers to form a multilayer film (e.g., as set out above) and then orienting the reflective film body by stretching at a selected temperature, optionally followed by heat-setting at a selected temperature. Alternatively, the extrusion and orientation steps may be performed simultaneously. By the orientation, the desired extent of birefringence (negative or positive) is set in those polymeric layers that comprise a polymer that can exhibit birefringence. Negative birefringence is obtained with polymers that show a negative optical stress coefficient, i.e., polymers for which the in-plane indices will decrease with orientation, whereas positive birefringence is obtained with polymers having a positive optical stress coefficient. This terminology in the art of film orientation conflicts somewhat with the standard optical definition of positive and negative birefringence. In the art of optics, a uniaxially positive birefringent film or layer is one in which the z-index of refraction is higher than the in-plane index. A biaxially stretched polymer film such as PET will have high in-plane indices, e.g., 1.65, and a low out-of-plane or z-axis index of 1.50. In the film making art, a material such as PET is said to be positively birefringent because the index increases in the stretch direction, but in the art of optics, the same material, after biaxially stretching to film, is said to have uniaxial negative birefringence because the z-index is lower than the in-plane indices which are substantially equal. The term "positive birefringence" for a material as used herein will be that of the polymer film art, and will mean that the index of refraction increases in the stretch direction. Similarly, the term "negative birefringence" for a material will mean that the index of refraction of a film decreases in the direction of stretch. The terms "uniaxially positive" or "uniaxially negative", when used in reference to a birefringent layer, will be taken to have the meaning in the optics sense.

In the case of polarizers, the reflective film body is stretched substantially in one direction (uniaxial orientation), while in the case of mirrors the film can be stretched substantially in two directions (biaxial orientation). In the latter case, the stretching may be asymmetric to introduce specially desired features, but is preferably symmetric.

The reflective film body may be allowed to dimensionally relax in the cross-stretch direction from the natural reduction: in cross-stretch (equal to the square root of the stretch ratio) or may be constrained (i.e., no substantial change in cross-stretch dimensions). The reflective film body may be stretched in the machine direction, as with a length orienter, and/or in width using a tenter.

The pre-stretch temperature, stretch temperature, stretch rate, stretch ratio, heat set temperature, heat set time, heat set relaxation, and cross-stretch relaxation are selected to yield a multilayer device having the desired refractive index relationship. These variables are inter-dependent; thus, for example, a relatively low stretch rate could be used if coupled with, e.g., a relatively low stretch temperature. It will be apparent to one skilled in the art how to select the appropriate combination of these variables to achieve the desired multilayer device. In general, however, a stretch ratio in the range from about 1:2 to about 1:10 (more preferably about 1:3 to about 1:7) in the stretch direction and from about 1:0.2 to about 1:10 (more preferably from about 1:0.2 to about 1:7) orthogonal to the stretch direction is preferred.

Orientation of the extruded film can be accomplished by stretching individual sheets of the material in heated air. For economical production, stretching may be accomplished on a continuous basis in a standard length orienter, tenter oven, or both. Economies of scale and line speeds of standard polymer film production may be achieved, thereby achieving manufacturing costs that are substantially lower than costs associated with commercially available absorptive polarizers.

Two or more multilayer films may also be laminated together to obtain a reflective film body in accordance with the present invention. Amorphous copolyesters, such as VITEL Brand 3000 and 3300 from the Goodyear Tire and Rubber Co. of Akron, Ohio, are useful as laminating materials. The choice of laminating material is broad, with adhesion to the multilayer films, optical clarity and exclusion of air being the primary guiding principles.

It may be desirable to add to one or more of the layers, one or more inorganic or organic adjuvants such as an antioxidant, extrusion aid, heat stabilizer, ultraviolet ray absorber, nucleator, surface projection forming agent, and the like in normal quantities so long as the addition does not substantially interfere with the performance of the present invention.

The preceding description of the present invention is merely illustrative, and is not intended to be limiting. Therefore, the scope of the present invention should be construed solely by reference to the appended claims.

What is claimed is:

1. A reflective film comprising a plurality of optical repeating units, wherein the optical repeating units vary in optical thickness to form an optical thickness profile that remains substantially constant over a plurality optical repeating units at a first optical thickness near one surface of the film, and that monotonically varies from the first optical thickness to a second optical thickness through a central portion of the film to define a reflection band.

2. The reflective film of claim 1, wherein the film is polymeric.

3. The reflective film of claim 1, wherein the first optical thickness is lower than the second optical thickness.

4. The reflective film of claim 1, wherein the first optical thickness is higher than the second optical thickness.

5. A reflective film comprising a plurality of optical repeating units, wherein the optical repeating units vary in optical thickness to form an overall optical thickness profile that remains substantially constant over a plurality of optical repeating units at a low optical thickness near one surface of the film, that remains substantially constant over a plurality of optical repeating units at a high optical thickness near the other surface or the film, and that monotonically increases from the low optical thickness to the high optical thickness through the remaining central portion of the film to define a reflection band.

6. The reflective film of claim 5, wherein the film is polymeric.

* * * * *

UNITED STATES PATENT AND TRADEMARK OFFICE
CERTIFICATE OF CORRECTION

PATENT NO. : 6,967,778 B1
APPLICATION NO. : 09/634319
DATED : November 22, 2005
INVENTOR(S) : John A. Wheatley It is certified that error appears in the above-identified patent and that said Letters Patent is hereby corrected as shown below:

Drawings on Sheet 9 of 12
Below 750 in Fig. 10b, delete "Wavlength" and insert -- Wavelength --, therefor.

Column 3
Line 47, after "stack" delete "," and insert -- ; --, therefor.

Column 4
Line 42, after "points" delete ";" and insert -- . --, therefor.
Line 46 (APPROXIMATELY), after "(FWHM)" insert -- , --.
Line 50, after "transmission" insert -- / --.
Line 66, after "having" delete ":".

Column 5
Line 11 (APPROXIMATELY), delete "riot" and insert -- and --, therefor.
Line 27, after "definition" delete ";" and insert -- , --, therefor.
Line 33, delete "or" and insert -- of --, therefor.
Line 45, delete "$n_x$," and insert -- $n_x$ --, therefor.
Line 48, after " ($n_2 < n_x$ and $n_y$) " insert -- . --.

Column 7
Line 30 (APPROXIMATELY), delete "FIG. 1c;" and insert -- FIG. 1c, --, therefor.

Column 12
Line 16, after "stack" and insert -- . --.

Column 14
Line 23, delete "n" and inset -- $n^i$ --, therefor.

Column 15
Line 13 (APPROXIMATELY), after "that" delete ":".
Line 53, delete "$(n_x^a n_x^b)^{1/2}$" and insert -- $(n_x^a n_x^c)^{1/2}$. --, therefor.
Line 54, delete "$(n_y^a n_y^c)$" and insert -- $(n_y^a n_y^c)$ --, therefor.

Column 16
Line 24, delete "Theological" and insert -- rheological --, therefor.
Line 39, (APPROXIMATELY), delete "e.," and insert -- e.g., --, therefor.
Line 47, delete "(sPS)" and insert -- (SPS) --, therefor.

UNITED STATES PATENT AND TRADEMARK OFFICE
CERTIFICATE OF CORRECTION

PATENT NO. : 6,967,778 B1
APPLICATION NO. : 09/634319
DATED : November 22, 2005
INVENTOR(S) : John A. Wheatley It is certified that error appears in the above-identified patent and that said Letters Patent is hereby corrected as shown below:

Column 17
Line 5, delete "ofterephthalic" and insert -- of terephthalic --, therefor.
Line 5, after "thereof" insert -- , --.

Column 18
Line 18, delete "feed back" and insert -- feedback --, therefor.

Column 19
Line 30, (APPROXIMATELY), before "in" delete ":".

Column 20
Line 29, (APPROXIMATELY), in Claim 1, after "plurality" insert -- of --.
Line 47, in Claim 5, delete "or" and insert -- of --, therefor.

Signed and Sealed this

Sixteenth Day of January, 2007

JON W. DUDAS
*Director of the United States Patent and Trademark Office*